US011204945B2

(12) United States Patent
Jacobs

(10) Patent No.: US 11,204,945 B2
(45) Date of Patent: Dec. 21, 2021

(54) AUTOMATIC GENERATION AND INSERTION OF OPERATIONS INTO A TIMELINE OF OPERATIONS VIA INTERACTIONS WITH A DATA VISUALIZATION

(71) Applicant: 1010data, Inc., New York, NY (US)

(72) Inventor: Adam L. Jacobs, Brookline, NH (US)

(73) Assignee: 1010data, Inc., New York, NY (US)

( * ) Notice: Subject to any disclaimer, the term of this patent is extended or adjusted under 35 U.S.C. 154(b) by 92 days.

(21) Appl. No.: 16/740,086

(22) Filed: Jan. 10, 2020

(65) Prior Publication Data

US 2020/0226155 A1 Jul. 16, 2020

Related U.S. Application Data

(60) Provisional application No. 62/791,473, filed on Jan. 11, 2019.

(51) Int. Cl.
*G06F 16/28* (2019.01)
*G06F 16/2458* (2019.01)
*G06F 16/22* (2019.01)
*G06F 16/248* (2019.01)

(52) U.S. Cl.
CPC ........ *G06F 16/287* (2019.01); *G06F 16/2228* (2019.01); *G06F 16/2282* (2019.01); *G06F 16/248* (2019.01); *G06F 16/2458* (2019.01)

(58) Field of Classification Search
CPC .. G06F 11/3438; G06F 11/3476; G06F 16/26; G06F 3/0482; G06F 3/04842; G06F 3/04847
USPC ........................................................ 707/737
See application file for complete search history.

(56) References Cited

U.S. PATENT DOCUMENTS

2017/0286155 A1\* 10/2017 Hosabettu ........... G06F 3/04842
2017/0315683 A1\* 11/2017 Boucher ............... G06F 3/0482
2017/0344541 A1\* 11/2017 Haeusler ................. G06F 16/93

\* cited by examiner

*Primary Examiner* — Hung T Vy
(74) *Attorney, Agent, or Firm* — Withrow & Terranova, PLLC

(57) ABSTRACT

Automatic generation and insertion of operations into a timeline of operations via interactions with a data visualization. A timeline structure comprising a plurality of operation records that identify successive operations performed against a table of data in response to user inputs is maintained. A data visualization is presented that presents a portion of the table of data in a particular state after a most recent operation is performed. One or more user inputs are received via user interaction with the data visualization. An operation against the table of data is performed to change the state of the table of data from the particular state to a new state. A new data visualization is presented that presents a portion of the table of data in the new state, and the timeline structure is altered to reflect the operation performed against the table of data.

14 Claims, 27 Drawing Sheets

FIG. 2

| | ANALYZE | QUERY | VIEW | VISUALIZE | | |
|---|---|---|---|---|---|---|
| 44-1 | 1 | +- ▽ | OPEN TABLE | WEATHER.HOURLY90 | | |
| 44-2 | 2 | +- | SELECT ROWS WHERE | (TEMP<99) | | |
| 44-3 | 3 | +- ▽ | LINK TO TABLE | WEATHER.STATIONS | | |
| 44-4 | 4 | +- ▽ | SELECT ROWS WHERE | STATE = "NY" | | |
| 44-5 | 5 | +- ▽ | COMPUTE TEMPF AS | 32+TEMP*9/5 | | |
| 44-6 | 6 | +- | TABULATION | | | |
| 44-7 | 7 | +- | SORT TABLE BY | AVG_TEMP | | |
| | 8 | | NEW OPERATION | | | |
| | | | CHOOSE A NEW OPERATION TO APPLY TO YOUR DATA | | | |
| 46 | | | SELECT | SORT | ARRANGE | |
| | | | LINK | COMPUTE | AMEND | |
| | | | TABULATE | MERGE | EXPAND | |
| | | | MORE... | | | |

TABULATION ON HOURLY US WEATHER

STATE=NY

| STATION NAME | AVG TEMP |
|---|---|
| NY LGA-AIRPORT | 51.43 |
| NY JFK-AIRPORT | 57.20 |
| ISLIP | 55.47 |
| ALBANY | 54.60 |
| SYRACUSE | 50.68 |
| BUFFALO | 50.40 |
| ROCHESTER | 50.33 |
| BINGHAMPTON | 50.02 |
| MASSINA | 48.10 |
| | 46.08 |

TABULATION ON HOURLY US WEATHER

STATE=NY

| STATION NAME | AVG TEMP | ELEVATION | LATITUDE/LONGITUDE |
|---|---|---|---|
| | 51.43 | | |
| NY LGA-AIRPORT | 57.20 | 19.5 | 40.7769° N, 73.8740° W |
| NY JFK-AIRPORT | 55.47 | 13.1 | 40.6413° N, 73.7781° W |
| ISLIP | 54.60 | 99 | 40.7956° N, 73.0988° W |
| ALBANY | 50.68 | 285 | 42.7487° N, 73.8055° W |
| SYRACUSE | 50.40 | 421 | 43.1066° N, 76.1038° W |
| BUFFALO | 50.33 | 724 | 42.9397° N, 78.7295° W |
| ROCHESTER | 50.02 | 559 | 43.1225° N, 77.6666° W |
| BINGHAMPTON | 48.10 | 1636 | 42.2087° N, 75.9814° W |
| MASSINA | 46.08 | 222 | 44.9361° N, 74.8442° W |

| STATE=NY | AVG TEMP | ELEVATION | LATITUDE/LONGITUDE |
|---|---|---|---|
| STATIC STATE= | 51.43 | | |
| NY LGA | 57.20 | 19.5 | 40.7769° N, 73.8740° W |
| NY JFK | 55.47 | 13.1 | 40.6413° N, 73.7781° W |
| IS | 54.60 | 99 | 40.7956° N, 73.0988° W |
| AL | 50.68 | 285 | 42.7487° N, 73.8055° W |
| SYRACUSE | 50.40 | 421 | 43.1066° N, 76.1038° W |
| BUFFALO | 50.33 | 724 | 42.9397° N, 78.7295° W |
| ROCHESTER | 50.02 | 559 | 43.1225° N, 77.6666° W |
| BINGHAMPTON | 48.10 | 1636 | 42.2087° N, 75.9814° W |
| MASSINA | 46.08 | 222 | 44.9361° N, 74.8442° W |

Dropdown: ALABAMA, ALASKA, ARIZONA, ARKANSAS, CALIFORNIA, COLORADO, CONNECTICUT

TABULATION ON HOURLY US WEATHER

TABULATION ON HOURLY US WEATHER

| STATE=CA | | | |
|---|---|---|---|
| STATION NAME | AVG TEMP | ELEVATION | LATITUDE/LONGITUDE |
| | 63.88 | | |
| DAGGETT | 66.27 | 1930 | 34.8573° N, 116.7882° W |
| BAKERSFIELD | 64.60 | 376 | 35.3314° N, 119.0021° W |
| LONG BEACH | 64.11 | 60 | 33.8177° N, 118.1524° W |
| SAN DIEGO | 63.55 | 17 | 32.7338° N, 117.1933° W |
| FRESNO | 63.45 | 336 | 36.7758° N, 119.7181° W |
| LOS ANGELES | 62.81 | 125 | 33.9416° N, 118.4085° W |
| REEDING | 62.27 | 505 | 40.5058° N, 122.2997° W |

*FIG. 3C*

TABULATION ON HOURLY US WEATHER

STATE=CA

| STATION NAME | AVG TEMP | ELEVATION | LATITUDE/LONGITUDE |
|---|---|---|---|
| | 63.02 | | |
| SAN DIEGO | 63.55 | 17 | 32.7338° N, 117.1933° W |
| FRESNO | 63.45 | 336 | 36.7758° N, 119.7181° W |
| LOS ANGELES | 62.81 | 125 | 33.9416° N, 118.4085° W |
| REEDING | 62.27 | 505 | 40.5058° N, 122.2997° W |

FIG. 3F

TABULATION ON HOURLY US WEATHER

STATE=CA

| STATION NAME | AVG TEMP | ELEVATION | LATITUDE/LONGITUDE |
|---|---|---|---|
| | 62.86 | | |
| FRESNO | 63.45 | 336 | 36.7758° N, 119.7181° W |
| REEDING | 62.27 | 505 | 40.5058° N, 122.2997° W |

| STATION NAME | AVG TEMP | ELEVATION | LATITUDE/LONGITUDE |
|---|---|---|---|
| | 62.86 | | |
| FRESNO | 63.45 | 336 | 36.7758° N, 119.7181° W |
| REEDING | 62.27 | 505 | 40.5058° N, 122.2997° W |

TABULATION ON HOURLY US WEATHER
STATE=CA

FIG. 3M

| STATION NAME | AVG TEMP | ELEVATION | LATITUDE/LONGITUDE |
|---|---|---|---|
| | 62.86 | | |
| FRESNO | 63.45 | 336 | 36.7758° N, 119.7181° W |
| REDDING | 62.27 | 505 | 40.5058° N, 122.2997° W |

TABULATION ON HOURLY US WEATHER
STATE=CA

AUTOMATIC GENERATION AND INSERTION OF OPERATIONS INTO A TIMELINE OF OPERATIONS VIA INTERACTIONS WITH A DATA VISUALIZATION

RELATED APPLICATIONS

This application claims the benefit of U.S. Provisional Application No. 62/791,473, filed on Jan. 11, 2019, entitled "AUTOMATIC GENERATION AND INSERTION OF OPERATIONS INTO TIMELINE OF OPERATIONS VIA INTERACTIONS WITH A DATA GRID," the disclosure of which is hereby incorporated herein by reference in its entirety.

BACKGROUND

Complex data analysis tools can be confusing to use. It is common to analyze a large amount of data iteratively, by, for example, using a filter function to limit the amount of data being presented to only data having certain attributes, and/or by transforming data using formulas, or by implementing mathematical operations on different fields of data to generate new fields of data. After a number of these operations have been performed against a large dataset, it can be relatively easy to lose track of what operations were performed to arrive at a particular set of data, thereby making changes to the sequence of operations difficult or impossible without starting over.

Some data analysis tools record operations performed against a table of data utilizing a timeline structure that contains an operation record for each operation made against the table of data. A timeline structure visualization of the timeline structure is presented on a display screen in conjunction with a data visualization that visualizes a portion of the data being analyzed. The user can thus view what operations have taken place against the data while concurrently viewing the data itself. New operations performed against the data are made via direct interaction and manipulation of the timeline structure visualization, by adding a new operation, deleting an operation, or altering an existing operation. Changes to the data in accordance with a change to the timeline structure are implemented immediately and presented in the data visualization.

While the ability to visually ascertain what operations have been made against a large table of data, and the ability to change any one of a succession of operations and automatically re-perform all subsequent operations is valuable, unfortunately, the timeline structure visualization itself occupies a portion of the display screen, thereby limiting the amount of data that can be concurrently presented in the data visualization. The timeline structure visualization can be "hidden" and removed from the display screen in order to enlarge the data visualization, but the timeline structure visualization must be "unhidden" and restored to perform additional operations against the data.

Moreover, determining what operations should be made against a large quantity of data in order to transform or filter the data to derive useful information by using a structure, such as the timeline structure visualization, that is separate from the data itself is not intuitive and can result in time-consuming experimentation and user dissatisfaction.

SUMMARY

The embodiments relate to a data transformation and analysis tool that allows operations to be made against a large table of data by interacting directly with the table of data. The embodiments concurrently maintain a timeline structure that comprises an operation record that corresponds to each operation made to the table of data. A user can, at any time, choose to view the timeline structure via a timeline structure visualization to ascertain what operations have been made against the table of data, and can, by interacting with the timeline structure visualization, alter any operation, add an operation, or remove an operation.

In one embodiment a method is disclosed. The method includes, in response to a plurality of user inputs received over a period of time, maintaining, by at least one computing device, a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields. The method further includes presenting, on a display device, a data visualization that presents at least a portion of the table of data in a particular state after a most recent operation is performed. The method further includes receiving one or more user inputs generated via user interaction with the data visualization. The method further includes, in response to the one or more user inputs, performing at least one operation against the table of data to change the state of the table of data from the particular state to a new state. The method further includes presenting, on the display device, a new data visualization that presents at least a portion of the table of data in the new state, and altering the timeline structure to reflect the at least one operation performed against the table of data to change the state of the table of data from the particular state to the new state.

In another embodiment a computing device is provided. The computing device includes a memory and a processor device coupled to the memory. The processor device is configured to, in response to a plurality of user inputs received over a period of time, maintain a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields. The processor device is further configured to present, on a display device, a data visualization that presents at least a portion of the table of data in a particular state after a most recent operation is performed. The processor device is further configured to receive one or more user inputs generated via user interaction with the data visualization. The processor device is further configured to, in response to the one or more user inputs, perform at least one operation against the table of data to change the state of the table of data from the particular state to a new state. The processor device is further configured to present, on the display device, a new data visualization that presents at least a portion of the table of data in the new state, and to alter the timeline structure to reflect the at least one operation performed against the table of data to change the state of the table of data from the particular state to the new state.

In another embodiment a computer program product is provided. The computer program product is stored on a non-transitory computer-readable storage medium and includes instructions configured to cause a processor device to, in response to a plurality of user inputs received over a period of time, maintain a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields. The instructions are further configured to present, on a display device, a data visualization that presents at least a portion of the table of data in a particular state after a most recent operation is performed. The instructions are further configured to receive one or more user inputs generated via user interaction with the data visualization. The instructions are further configured to, in response to the one or more user inputs, perform at least one operation against the table of data to change the state of the table of data from the particular state to a new state. The instructions are further configured to present, on the display device, a new data visualization that presents at least a portion of the table of data in the new state, and alter the timeline structure to reflect the at least one operation performed against the table of data to change the state of the table of data from the particular state to the new state.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a visualization that may be presented on a display device in accordance with one embodiment;

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

The embodiments relate to a data transformation and analysis tool that allows operations to be made against a large table of data by interacting directly with the table of data. The embodiments concurrently maintain a timeline structure that comprises an operation record that corresponds to each operation made to the table of data. A user can, at any time, choose to view the timeline structure via a timeline structure visualization to ascertain what operations have been made against the table of data, and can, by interacting with the timeline structure visualization, alter any operation, add an operation, or remove an operation. Alternatively, the user can choose to perform operations against the table of data via direct interactions with a visualization of the table of data, and each such operation will automatically be inserted into the timeline structure to record the operation, and to facilitate subsequent presentation of the timeline structure visualization at the user's request.

Figure 1:
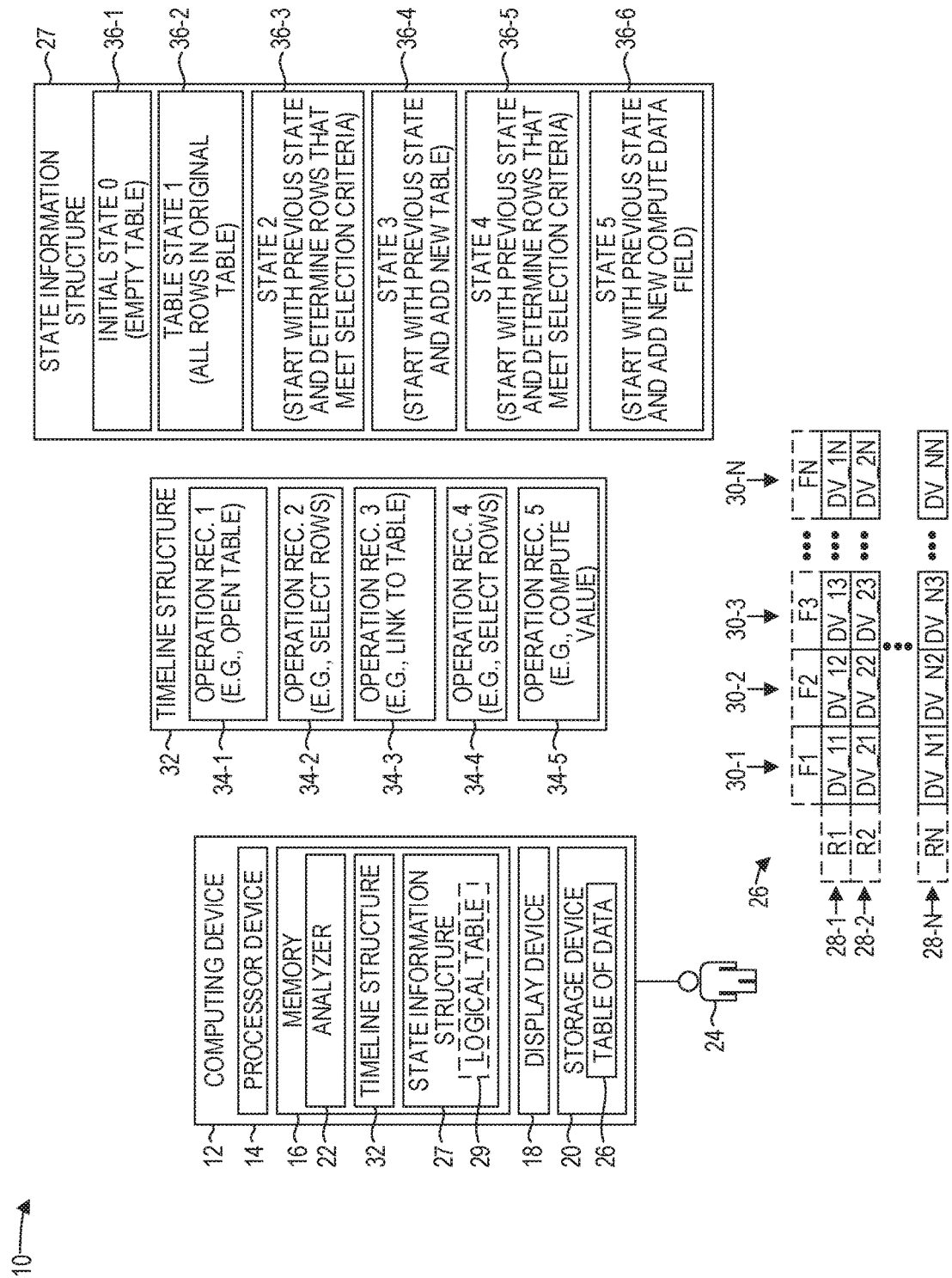
FIG. 1 is a block diagram of an environment in which embodiments disclosed herein may be practiced.

FIG. 1 is a block diagram of an environment 10 in which embodiments disclosed herein may be practiced. The environment 10 includes one or more computing devices 12. The computing device 12 includes one or more processor devices 14, one or more memories 16, a display device 18 and a storage device 20. The memory 16 includes a data analysis and visualization tool 22 (hereinafter "analyzer 22" for purposes of brevity). A user 24 interacts with the analyzer 22 to manipulate an original table of data 26. The table of data 26 includes a plurality of rows 28-1-28-N (generally, rows 28), labeled R1-RN in FIG. 1. Each row 28 includes the same data fields 30-1-30-N (generally, data fields 30), labelled F1-FN in FIG. 1. The data fields 30 of the rows 28 each contain a data value that corresponds to the particular field. As an example, if the data field 30-1 is a city field, the data value contained in the data field 30-1 of the row 28-1 may be "TULSA". Similarly, the data value contained in the data field 30-1 of the row 28-2 may be "DAYTON". If the data field 30-2 is a state field, the data value contained in the data field 30-2 of the row 28-1 may be "OK". Similarly, the data value contained in the data field 30-2 of the row 28-2 may be "OH". The table of data 26 may comprise any number of rows, such as thousands of rows or millions of rows, and the table of data 26 may comprise any number of fields, such as tens of fields, hundreds of fields, or thousands of fields.

The user 24, over a period of time, enters operations via visualizations presented on the display device 18 by the analyzer 22 to analyze and transform the table of data 26. Note that unless otherwise requested by the user 24, the transformations are not actually made to the table of data 26, but are rather maintained in a state information structure 27, which, in essence, maintains a logical table 29 that reflects, at any given point of time, a state of the table of data 26 after one or more operations have been requested by the user 24.

The term "visualization" as used herein refers to imagery that is generated and presented on the display device 18 that allows the user 24 to view information and interact with the analyzer 22 using one or more input devices, such as a mouse, a keyboard, a touch sensitive surface, and the like.

As the user 24 enters operations against the table of data 26, the analyzer 22 maintains a timeline structure 32 that includes a plurality of operation records 34-1-34-5 (generally operation records 34), each operation record 34 corresponding to and identifying a particular operation of a plurality of successive operations made via user inputs against the table of data 26. At least some of the operations alter a state of the table of data 26, as reflected in states 36-1-36-6 (generally, states 36).

Initially, the analyzer 22 presents an initial visualization to the user 24 on the display device 18 that allows the user 24 to enter some operation. At this point in time, the logical table 29 is at a state 36-1, an empty state. In this example, the user 24 enters an open table operation identifying the table of data 26. The analyzer 22 records the open table operation in the operation record 34-1, and generates a state 36-2, which identifies all the rows 28 contained in the table of data 26. Note that the analyzer 22 does not physically copy the table of data 26 to the logical table 29, but rather maintains information that indicates that the logical table 29, after the open table operation, logically contains all the rows 28 contained in the table of data 26. After each operation entered by the user 24, the analyzer 22 generates and presents on the display device 18 a data visualization that depicts at least a portion of the table of data 26 in the current state 36. The user 24 may use user interface (UI) controls, such as scroll bars, arrow keys, or the like, to cause the analyzer 22 to generate new data visualizations that depict different portions of the table of data 26.

The user 24 then enters a selection operation which identifies some criteria to be used by the analyzer 22 to select a subset of the rows 28 of the original table of data 26. As an example, the user 24 may enter selection criteria where the data field 30-1 is equal to "TULSA" to select only those rows 28 wherein the data field 30-1 of the row 28 is equal to "TULSA".

The analyzer 22 performs the selection operation and records the selection operation in the operation record 34-2. The analyzer 22 also generates a state 36-3, which identifies all those rows 28 contained in the table of data 26 wherein the data field 30-1 is equal to "TULSA". Note that the operation record 34-2 contains information that identifies both the operation and all relevant parameters to the operation, such as, in this case, the criteria that the data field 30-1 is equal to "TULSA". The analyzer 22 generates and presents on the display device 18 a data visualization that depicts at least a portion of the table of data 26 in the current state 36-3.

As will be discussed in greater detail below, the analyzer 22 is multi-modal, and allows the user 24 to enter operations via different modes. In one mode, the analyzer 22 presents a timeline structure visualization of the timeline structure 32 on the display device 18 such that the user 24 can view each operation made against the table of data 26, and can alter any such operation, or can enter a new operation. In another mode, the analyzer 22 presents a data visualization on the display device 18 that depicts a portion of the table of data 26 at a particular state 36. The user 24 can interact directly with the table of data 26 without interacting with a visualization of the timeline structure 32 to change previous operations or enter new operations. Operations entered via interactions with the data visualization, however, are still recorded in the timeline structure 32, and thus the user 24 can, at any time, request that a timeline structure visualization be presented on the display device 18, and the user 24 can both view all previous operations entered by the user 24, irrespective of the mode by which the user 24 entered the operation, and can amend any such operation via the timeline structure visualization. Interacting with a data visualization that presents data values in context with rows 28 may be substantially more intuitive for the user 24.

The user 24 then enters, via either the current data visualization being presented on the display device 18, or via a timeline structure visualization being presented on the display device 18, a link operation. The link operation identifies an additional table of data (not illustrated), and incorporates the additional table of data into the logical table 29 based on one or more data fields 30-1 that are common to both the table of data 26 and the additional table of data. The analyzer 22 performs the link operation and records the link operation in the operation record 34-3. The analyzer 22 also generates a state 36-4, which identifies all rows from the new table of data. The analyzer 22 generates and presents on the display device 18 a data visualization that depicts at least a portion of the table of data 26 in the current state 36-4.

The user 24 then enters another selection operation. The selection operation identifies some criteria for the analyzer 22 to select a subset of the rows 28 of the table of data 26 at the state 36-4, or the rows added by the link operation. The analyzer 22 performs the selection operation and records the selection operation in the operation record 34-4. The analyzer 22 also generates a state 36-5, which identifies the selected row. The analyzer 22 generates and presents on the display device 18 a data visualization that depicts at least a portion of the table of data 26 in the current state 36-5.

The user 24 then enters another computer operation. The computer operation implements some transformation on a data field 30 to generate a new data field 30. The analyzer 22 performs the computer operation and records the computer operation in the operation record 34-5. The analyzer 22 also generates a state 36-6. The analyzer 22 generates and presents on the display device 18 a data visualization that depicts at least a portion of the table of data 26 in the current state 36-6, illustrating the newly computed data field 30.

Note that the user 24 can alter any of the operations previously entered via interaction with a timeline structure visualization or via interaction with a data visualization. Upon altering a particular operation, the analyzer 22 will generate a new state 36 of the logical table 29 in view of the alteration, and will then reapply each subsequent operation identified in the timeline structure 32, resulting in new states 36 after performing each such operation.

As an example, assume that after entering the compute operation identified in the operation record 34-5, the user 24 chooses to alter the selection criteria of the selection operation identified in the operation record 34-2. In particular, the user 24 requests that the selection operation be performed using the city criteria of "DAYTON" rather than "TULSA". The analyzer 22 begins with the state 36-2 prior to having performed the original selection operation, and performs the selection operation using the criteria of "DAYTON" rather than "TULSA", resulting in a new state 36 that differs from the state 36-3 since a new selection criteria was used. The analyzer 22 may then automatically perform the operations identified in the operation records 34-3-34-5, using the original parameters identified in the operation records 34-3-34-5, resulting in a different final (i.e., current) state 36 than that of the state 36-6. The analyzer 22 then generates a data visualization that depicts at least a portion of the table of data 26 in the final state 36.

Although the embodiments, solely for the purpose of simplicity, are illustrated as being executed on a single computing device 12, in some embodiments the functionality disclosed herein may be implemented in a client-server architecture, such that the functionality described herein may be implemented by a plurality of computing devices 12. In such embodiments, for example, the computing device 12 may be communicatively coupled to a server computing device 12 via one or more networks. The computing device 12 may, such as via a web browser, access a uniform resource identifier (URI) that resolves to the server computing device. In response, the server computing device 12 may then send the analyzer 22 to the computing device 12. The analyzer 22 may implement certain of the functionality disclosed herein below, generating and presenting visualizations on the display device 18, and processing all user inputs. The server computing device 12 may have access to the table of data 26 and may, by way of non-limiting example, implement the operations performed against the table of data 26, maintain the states 36, and maintain the timeline structure 32.

FIG. 2 is a visualization 38 that may be presented on the display device 18 in accordance with one embodiment. The visualization 38 includes a timeline structure visualization 40 and a data visualization 42 that depicts a portion of a table of data. The term "timeline structure visualization" as used herein refers to information that identifies a succession of operations performed on a table of data. The term "data visualization" as used herein refers to information that identifies data values derived from a table of data, such as the table of data 26 illustrated in FIG. 1, after one or more successive operations have been performed on the table of data. A data visualization does not include the timeline structure visualization, and the timeline structure visualization does not include the data visualization. The data visualizations illustrated herein are in the form of a grid of data; however, the embodiments are not limited to data visualizations in the form of a data grid, and have applicability to other data visualizations, such as graphs, histograms, and the like.

In this example, the timeline structure visualization 40 contains a plurality of operation record visualizations 44-1-44-7, each of which corresponds to a particular operation performed on a table of data 26. Note that the operations identified in the operation record visualizations 44-1-44-7 are different from, and unrelated to, those identified in FIG. 1, and the table of data 26 contains different data fields and data values than the table of data 26 illustrated in FIG. 1. The timeline structure visualization 40 identifies the operations in the order in which the operations were performed. Thus, in this example, an open operation, a select operation, a link operation, a select operation, a compute operation, a tabulation operation, and a sort operation have been performed against the table of data 26. The data visualization 42 visually depicts at least a portion of rows 28 of the current state 36 of the table of data 26 after the seven operations have been performed on the table of data 26. Each of the rows 28 includes a data field 30-A, which is a weather station name, and a data field 30-B, which is an average temperature at that weather station. The rows 28 may include additional data fields 30 that are not depicted due to space constraints on the display device 18, but which may be seen by the user 24 by activating a scroll bar or other UI control.

The user 24 can alter the operations identified by the operation record visualizations 44-1-44-7, or can add a new operation by interacting with a new operation visualization 46. As an example, in one mode, the user 24 can interact with the operation record visualization 44-4 to alter the selection criteria from "NY" to "CA". The interaction may, for example, be to click once or twice on the operation record visualization 44-4, which then causes the operation record visualization 44-4 to change to allow the user 24 to alter the selection criteria. User actions with a visualization are referred to herein, from the perspective of the analyzer 22, as user inputs.

The analyzer 22 performs the new selection operation on the table of data 26 starting with a state 36 of the table of data 26 immediately after the link operation, identified in the operation record visualization 44-3, was performed. The analyzer 22 then performs the operations identified in the operation record visualizations 44-5-44-7 and generates a new data visualization showing information similar to that illustrated in the data visualization 42, except of weather stations in California rather than New York.

Alternatively, the user 24 can interact directly with the data visualization 42 to alter the select operation that corresponds to the operation record visualization 44-4. Assume that the user 24 selects a hide control 48 that requests that the timeline structure visualization 40 be "hidden" (i.e., removed). In response, the analyzer 22 generates and presents on the display device 18 a new data visualization 50, as illustrated in FIG. 3A, and the timeline structure visualization 40 is no longer presented on the display device 18. Due to the additional space, additional data fields 30-C and 30-D of the rows 28 are visually depicted.

In this example, the data visualization 50 includes a quick filter control 52 that corresponds to the select operation identified in the operation record visualization 44-4 (FIG. 2). The user 24 selects the quick filter control 52, such as by clicking on the quick filter control 52. Referring now to FIG. 3B, the analyzer 22, in response to the user input that activated the quick filter control 52, presents a window 54 that allows the user 24 to change the selection criteria to a different state 36. The user 24 selects California. The analyzer 22 modifies the operation record that corresponds to the operation record visualization 44-4 (FIG. 2) to alter the selection criteria from "NY" to "CA". The analyzer 22 performs the new selection operation on the table of data 26 starting with a state 36 of the table of data 26 immediately after the link operation, identified in the operation record visualization 44-3, was performed. The analyzer 22 then performs the operations identified in the operation record visualizations 44-5-44-7 to move the table of data 26 to a current state 36. Referring now to FIG. 3C, the analyzer 22 generates a new data visualization 56 showing information similar to that illustrated in the data visualization 50, except of weather stations in California rather than New York.

Figure 3D:
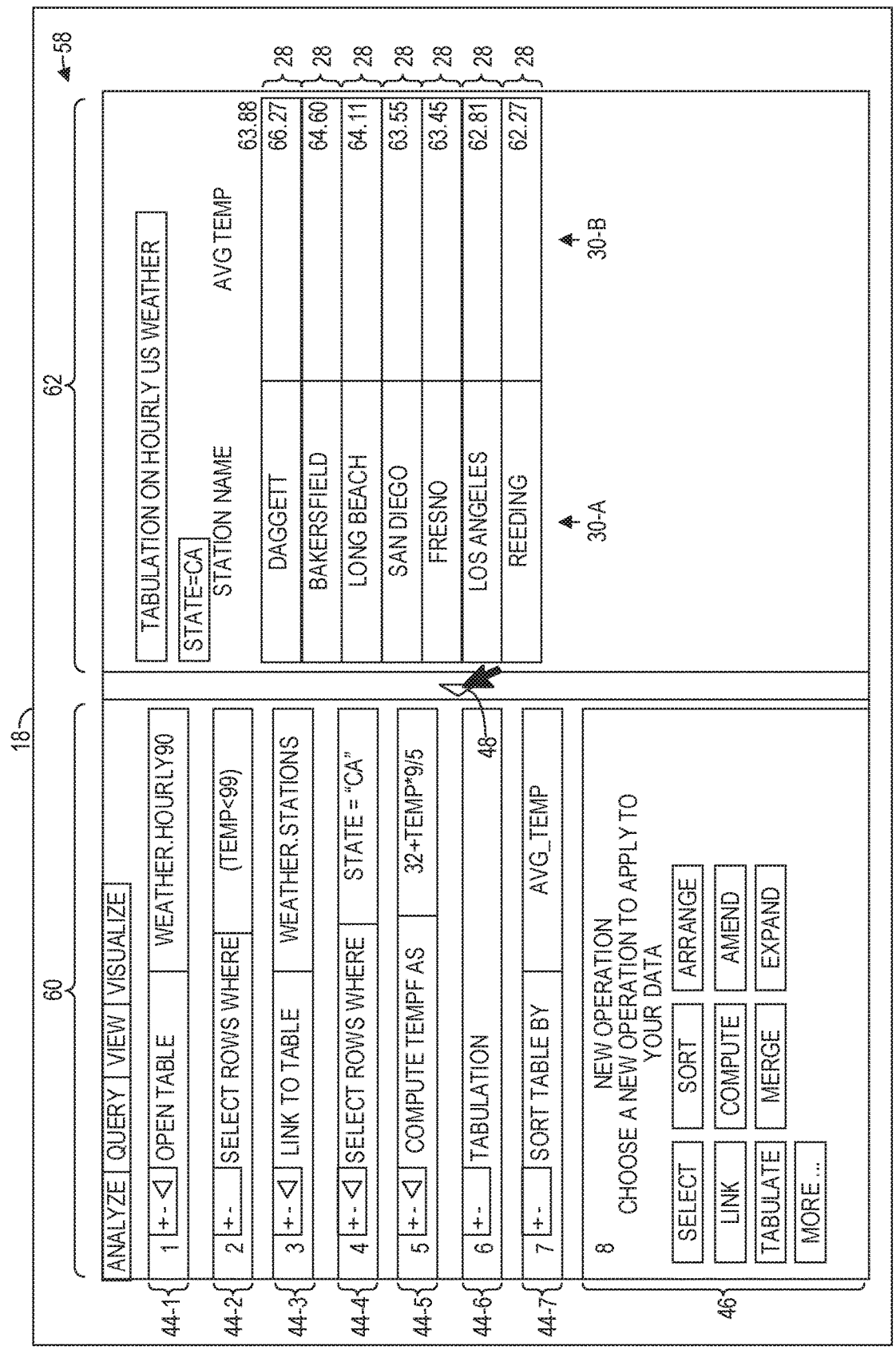
FIGS. 3A-3N illustrate various visualizations that may be presented on a display device in accordance with various embodiments disclosed herein.

Referring now to FIG. 3D, the user 24 requests that a timeline structure visualization be presented on the display device 18. The analyzer 22 generates a visualization 58 which includes a timeline structure visualization 60 and a data visualization 62 that depicts a portion of a table of data 26 after the operations identified in the timeline structure visualization 60 have been performed. Note that the operation record visualization 44-4 now indicates that the selection criteria is "CA" rather than "NC".

Figure 3E:
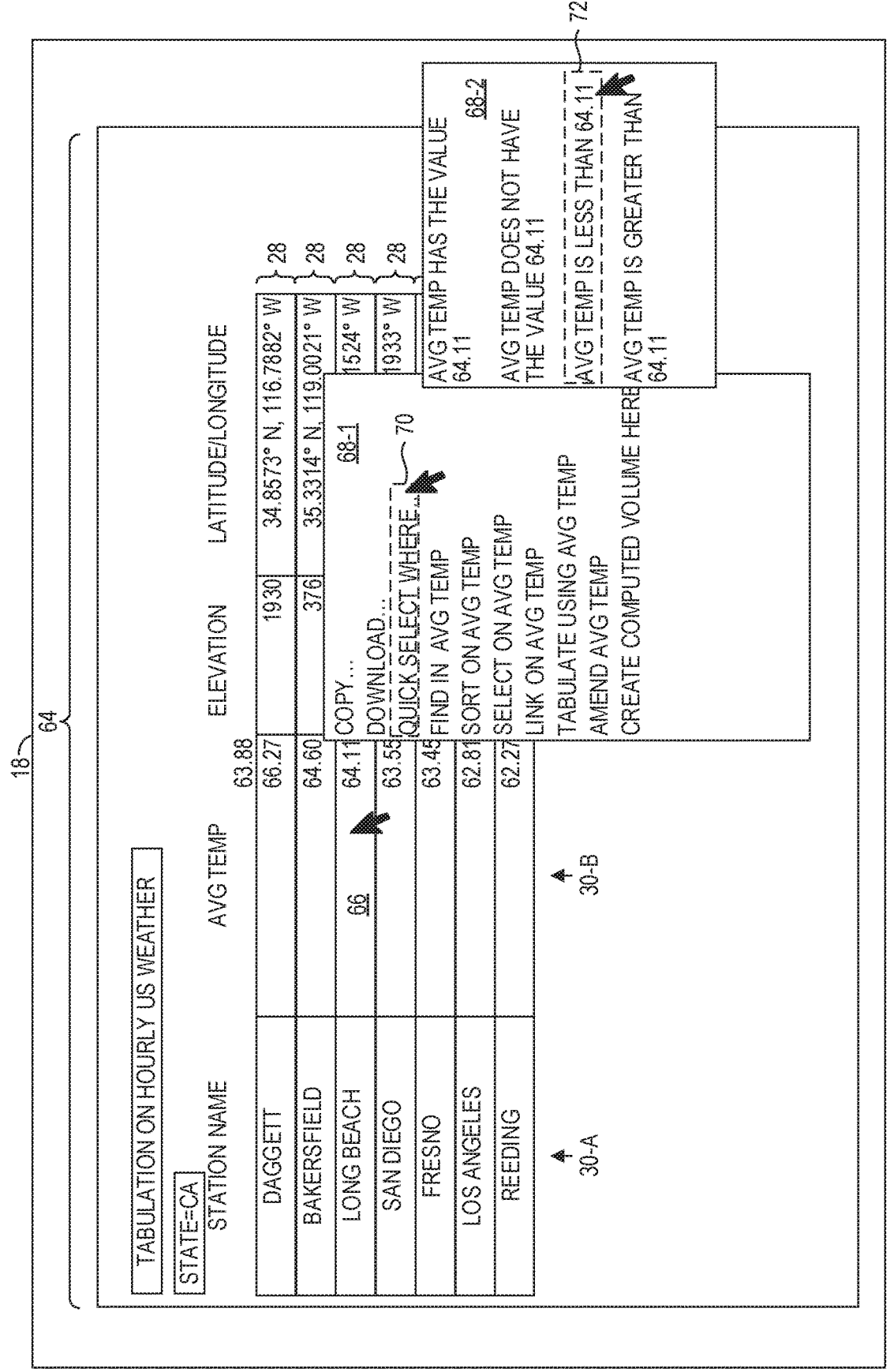

Assume that the user 24 selects the hide control 48 that requests that the timeline structure visualization 60 be "hidden" (i.e., removed). In response, the analyzer 22 generates and presents on the display device 18 a new data visualization 64, as illustrated in FIG. 3E, and the timeline structure visualization 60 is no longer presented on the display device 18. Due to the additional space, the additional data fields 30-C and 30-D of the rows 28 are visually depicted. Assume that the user 24 right clicks on, or otherwise selects, a data field 66 depicted in the data visualization 64. The analyzer 22 generates and presents over the data visualization 64 an operation visualization 68-1 that lists a plurality of commands that can be implemented. Some of the commands are operations, such as a select operation, a sort operation, a link operation, a tabulate operation, an amend operation, and a computed value operation. The user 24 selects a quick select command 70, which corresponds to a select operation. In response, the analyzer 22 generates and presents over the data visualization 64 an operation visualization 68-2 that provides predetermined selection criteria based on the data value of the data field 66. The user 24 selects an option 72 that corresponds to a selection criteria wherein the average temperature is less than that of the data value in the data field 66 (i.e., 64.11).

The analyzer 22 generates a new operation record in the timeline structure that performs a select operation on the table of data 26 such that only rows 28 of the table of data 26 that have an average temperature less than 64.11 are selected. The analyzer 22 then generates a new data visualization 74 and presents the new data visualization 74 on the display device 18, as illustrated in FIG. 3F. At this point, the state 36 of the table of data 26 is limited to those rows having an average temperature less than 64.11.

Figure 3G:
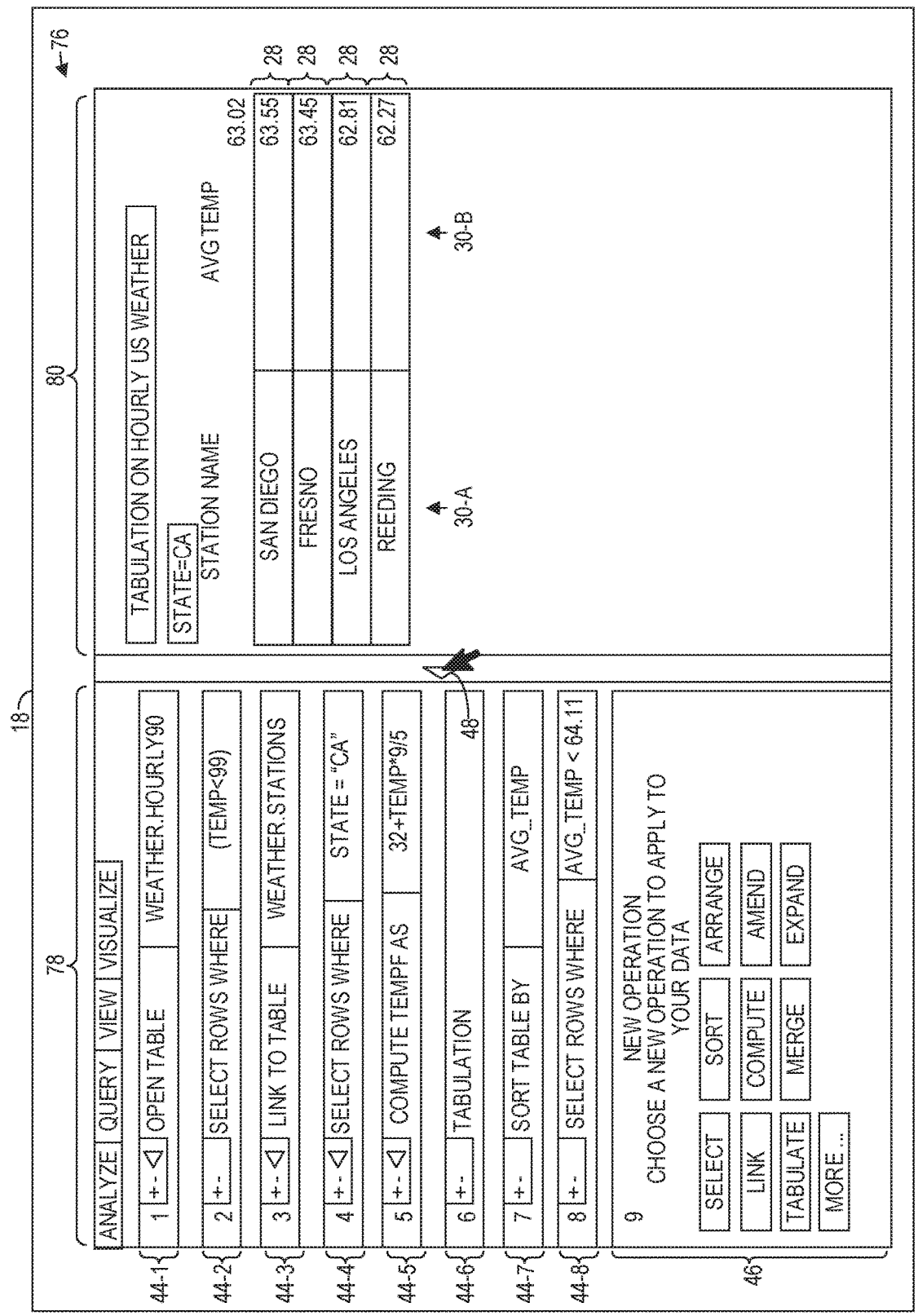
Figure 3H:
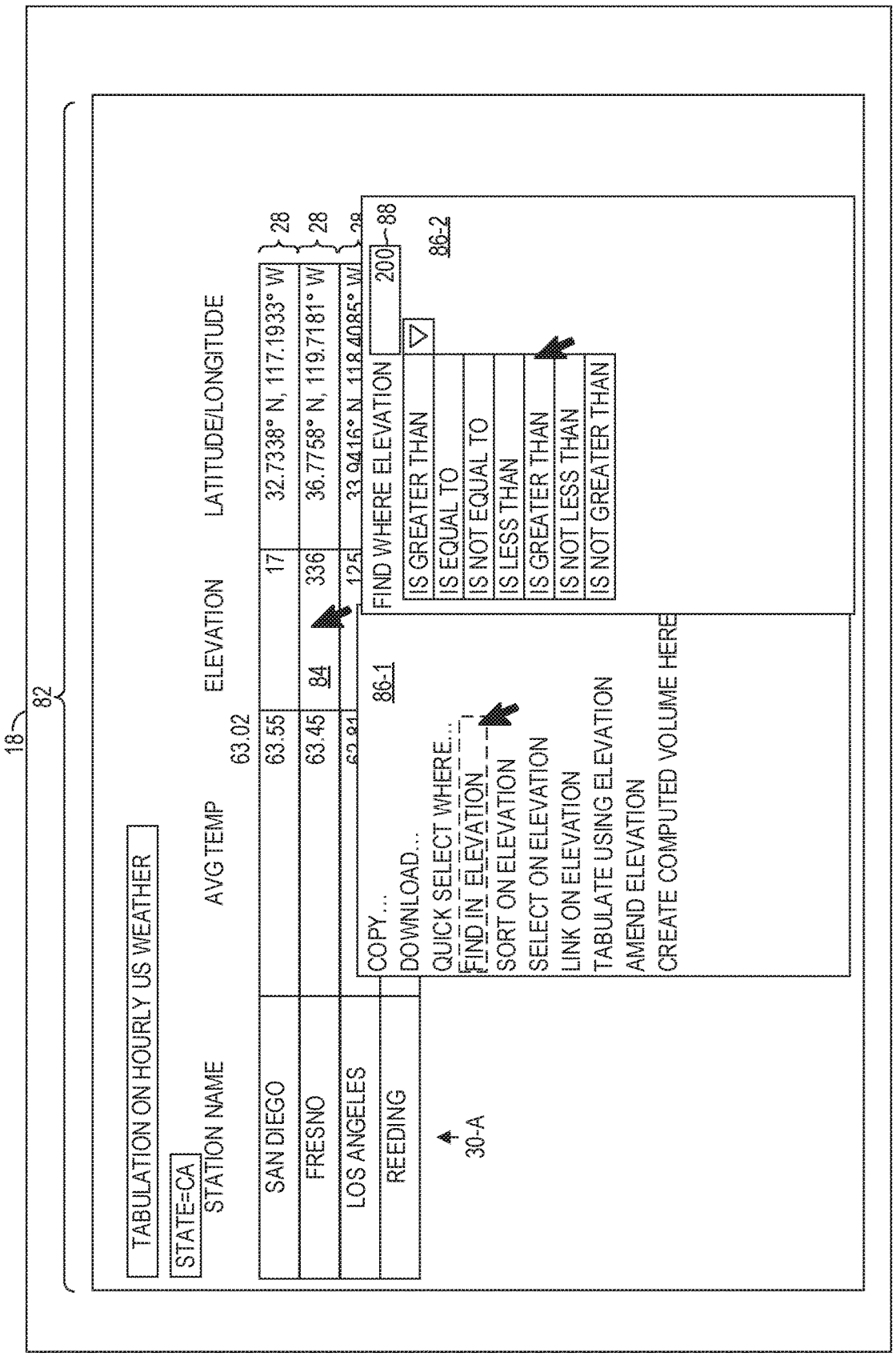

Referring now to FIG. 3G, the user 24 requests that a timeline structure visualization be presented on the display device 18. The analyzer 22 generates a visualization 76 which includes a timeline structure visualization 78 and a data visualization 80 that depicts a portion of the table of data 26 after the operations identified in the timeline structure visualization 78 have been performed. Note that the timeline structure visualization 78 now includes an operation record visualization 44-8 that identifies the select operation requested by the user 24 discussed in FIG. 3F. Assume that the user 24 selects the hide control 48 that requests that the timeline structure visualization 78 be "hidden" (i.e., removed). In response, the analyzer 22 generates and presents on the display device 18 a new data visualization 82, as illustrated in FIG. 3H, and the timeline structure visualization 78 is no longer presented on the display device 18. Due to the additional space, additional data fields 30-C and 30-D of the rows 28 are visually depicted.

The user 24 right clicks on, or otherwise selects, a data field 84 depicted in the data visualization 82. The analyzer 22 generates and presents over the data visualization 82 an operation visualization 86-1 that lists a plurality of commands that can be implemented. In this example, the user 24 selects the find command. In response, the analyzer 22 generates and presents over the data visualization 82 an operation visualization 86-2 that provides predetermined conditions, such as "IS GREATER THAN", "IS EQUAL TO", and the like, that can be selected by the user 24. The operation visualization 86-2 also includes an input box 88 in which the user 24 can enter a value to be used in conjunction with the selected predetermined condition. In this example, the user 24 selects the predetermined condition "IS GREATER THAN" and enters the value 200. The analyzer 22 receives the user input and locates each row 28 wherein the elevation data field 30-C has a value greater than 200, and generates a new data visualization 90, as illustrated in FIG. 3I, which visually distinguishes such rows 28.

The new data visualization 90 visually indicates that rows 28-A and 28-B each contain a data value in the elevation data field 30-C that has a value greater than 200. Note that the find command does not result in a new operation record being created in the timeline structure 32. The find command is merely a mechanism to allow the user 24 to easily traverse the table of data 26, in the current state, to locate rows that have a certain criteria.

The user 24, however, selects a convert-to-select control 92 depicted in the data visualization 90. The analyzer 22 receives the user input that selects the convert-to-select control 92, and generates a new operation record in the timeline structure 32 that performs a select operation on the table of data 26 such that only rows 28 of the table of data 26 that have an elevation greater than 200 are selected. The analyzer 22 then generates a new data visualization 94 and presents the new data visualization 94 on the display device 18, as illustrated in FIG. 3J. At this point, the state 36 of the table of data 26 is limited to those rows 28 in which the average temperature data field 30-B has a data value less 64.11 and in which the elevation data field 30-C has a data value greater than 200.

Figure 3L:
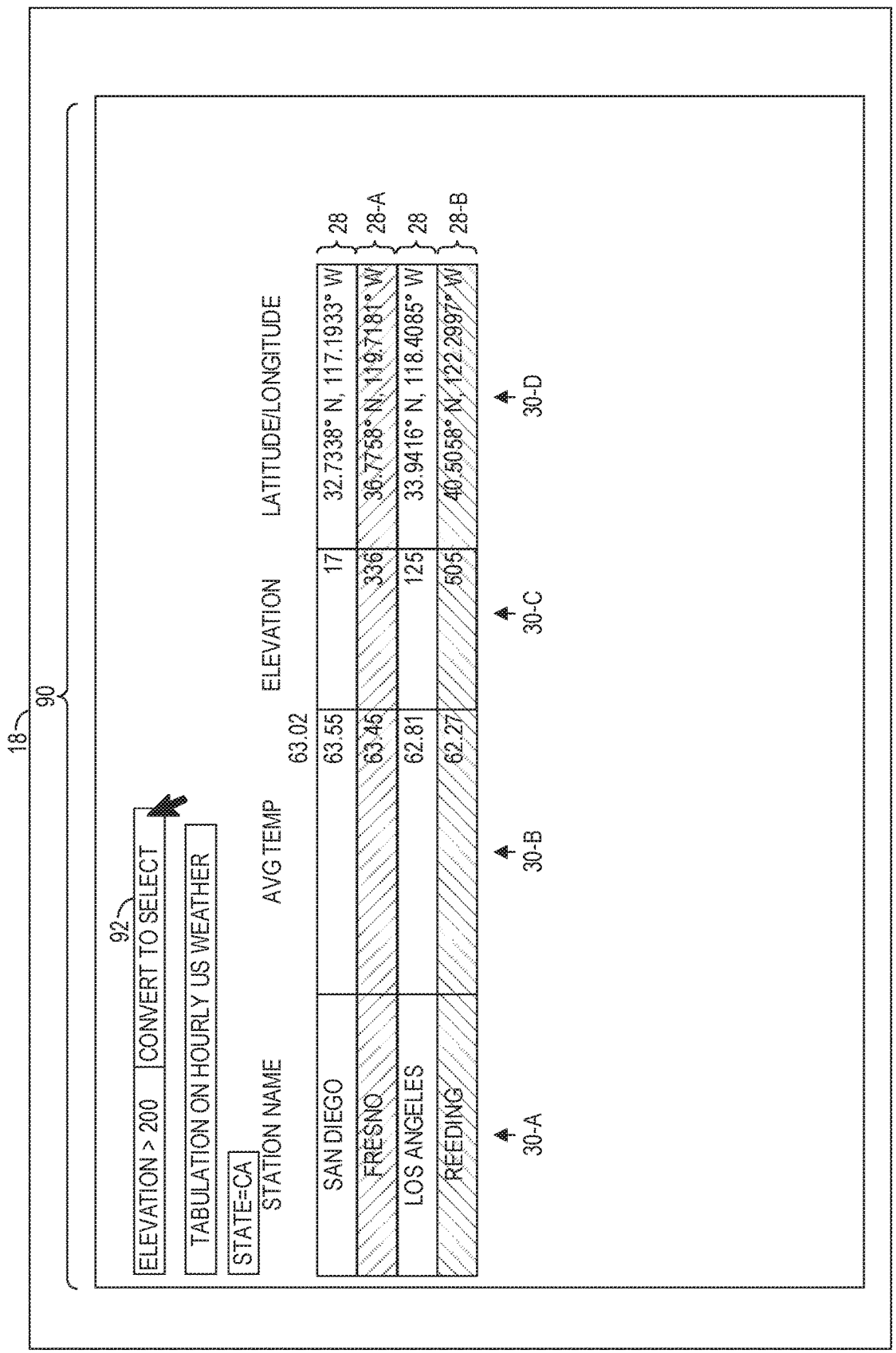
Figure 3K:
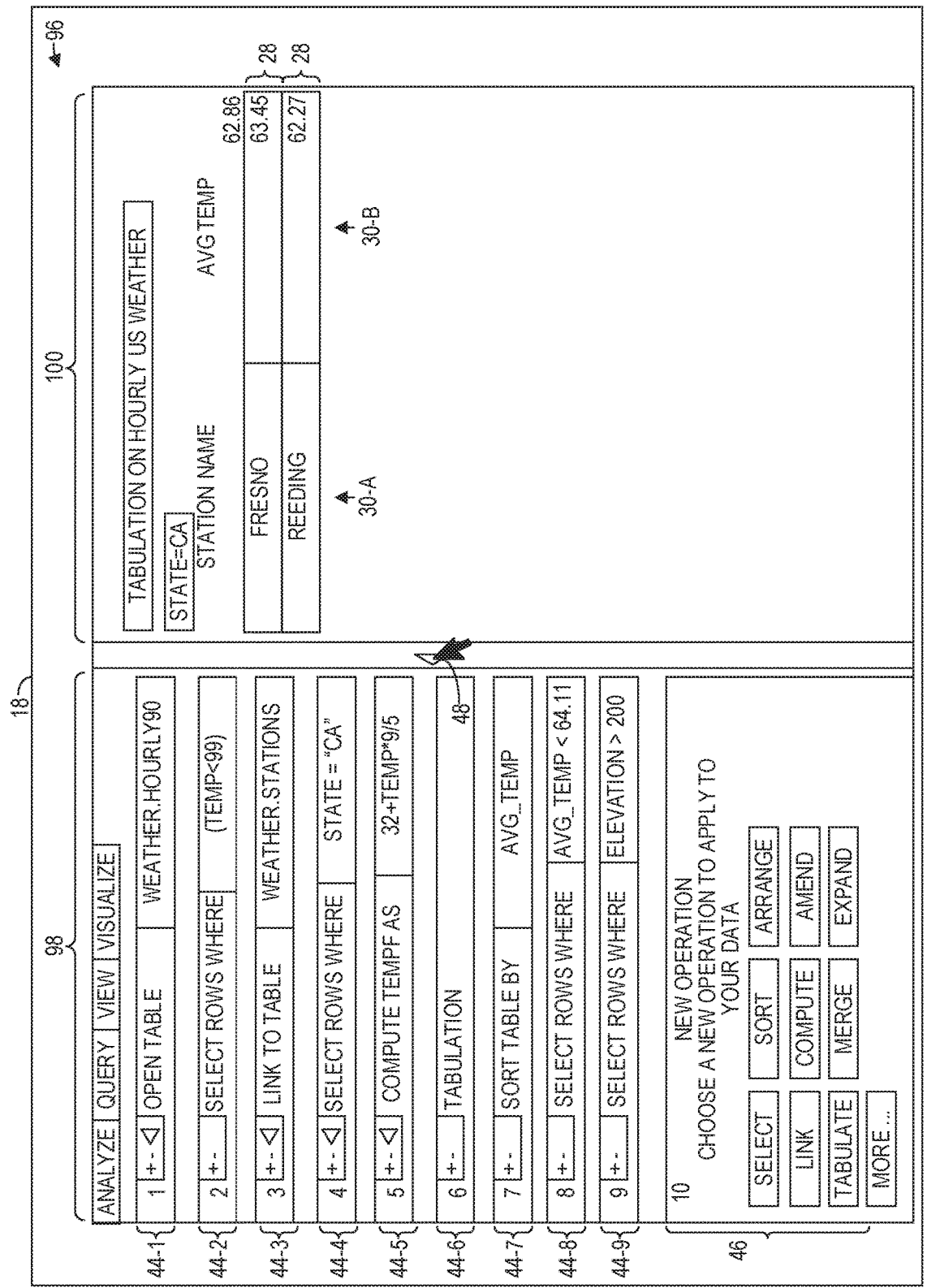

Referring now to FIG. 3K, the user 24 requests that a timeline structure visualization be presented on the display device 18. The analyzer 22 generates a visualization 96 that includes a timeline structure visualization 98 and a data visualization 100 that depicts a portion of the table of data 26 after the operations identified in the timeline structure visualization 78 have been performed. Note that the timeline structure visualization 78 now includes an operation record visualization 44-9 that identifies the select operation requested by the user 24 discussed in FIG. 3J.

Assume that the user 24 selects the hide control 48 that requests that the timeline structure visualization 98 be "hidden" (i.e., removed). In response, the analyzer 22 generates and presents on the display device 18 a new data visualization 102, as illustrated in FIG. 3L, and the timeline structure visualization 98 is no longer presented on the display device 18. Due to the additional space, the additional data fields 30-C and 30-D of the rows 28 are visually depicted. The user 24 notices that the data value of a data field 104 is misspelled. The user 24 selects the data field 104, such as by double clicking on the data field 104. In response to this user input, the analyzer 22 generates a new data visualization 106 and presents the data visualization 106 on the display device 18 as illustrated in FIG. 3M. The data visualization 106 now includes an input control 108 that allows the user 24 to replace the data value of the data field 104. The user 24 enters the text "REDDING" in the input control 108 and presses the enter key. In response to this user input, the analyzer 22 generates a new operation record in the timeline structure 32 that performs an amend operation on the data value of the data field 104.

Figure 3N:
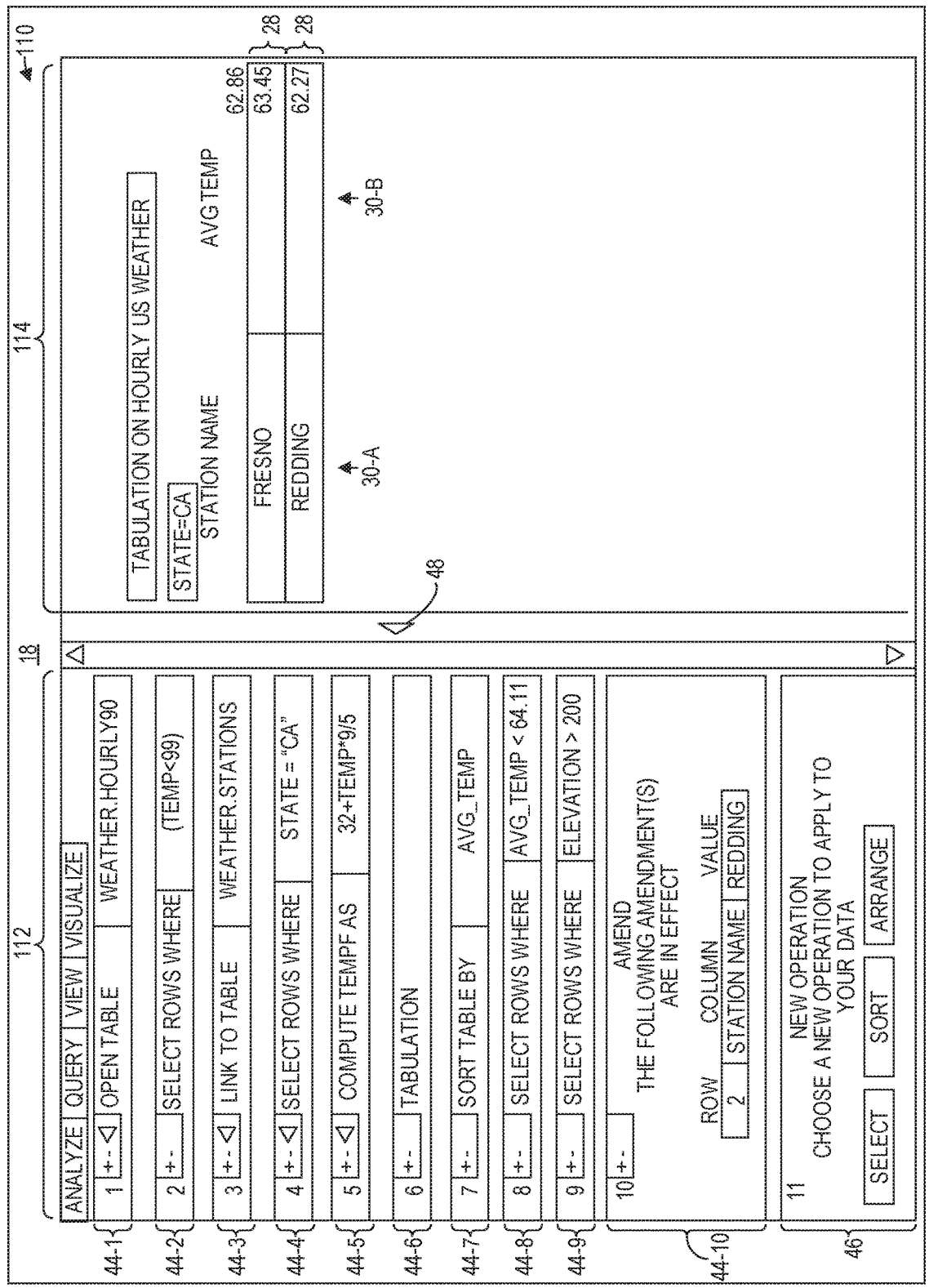

Referring now to FIG. 3N, the user 24 requests that a timeline structure visualization be presented on the display device 18. The analyzer 22 generates a visualization 110 that includes a timeline structure visualization 112 and a data visualization 114 that depicts a portion of the table of data 26 after the operations identified in the timeline structure visualization 112 have been performed. Note that the timeline structure visualization 112 now includes an operation record visualization 44-10 that identifies the amend operation requested by the user 24 as discussed with reference to FIG. 3M.

It is noted that because the analyzer 22 is a component of the computing device 12, functionality implemented by the analyzer 22 may be attributed to the computing device 12 generally. Moreover, in examples where the analyzer 22 comprises software instructions that program the processor device 14 to carry out functionality discussed herein, functionality implemented by the analyzer 22 may be attributed herein to the processor device 14.

Figure 4:
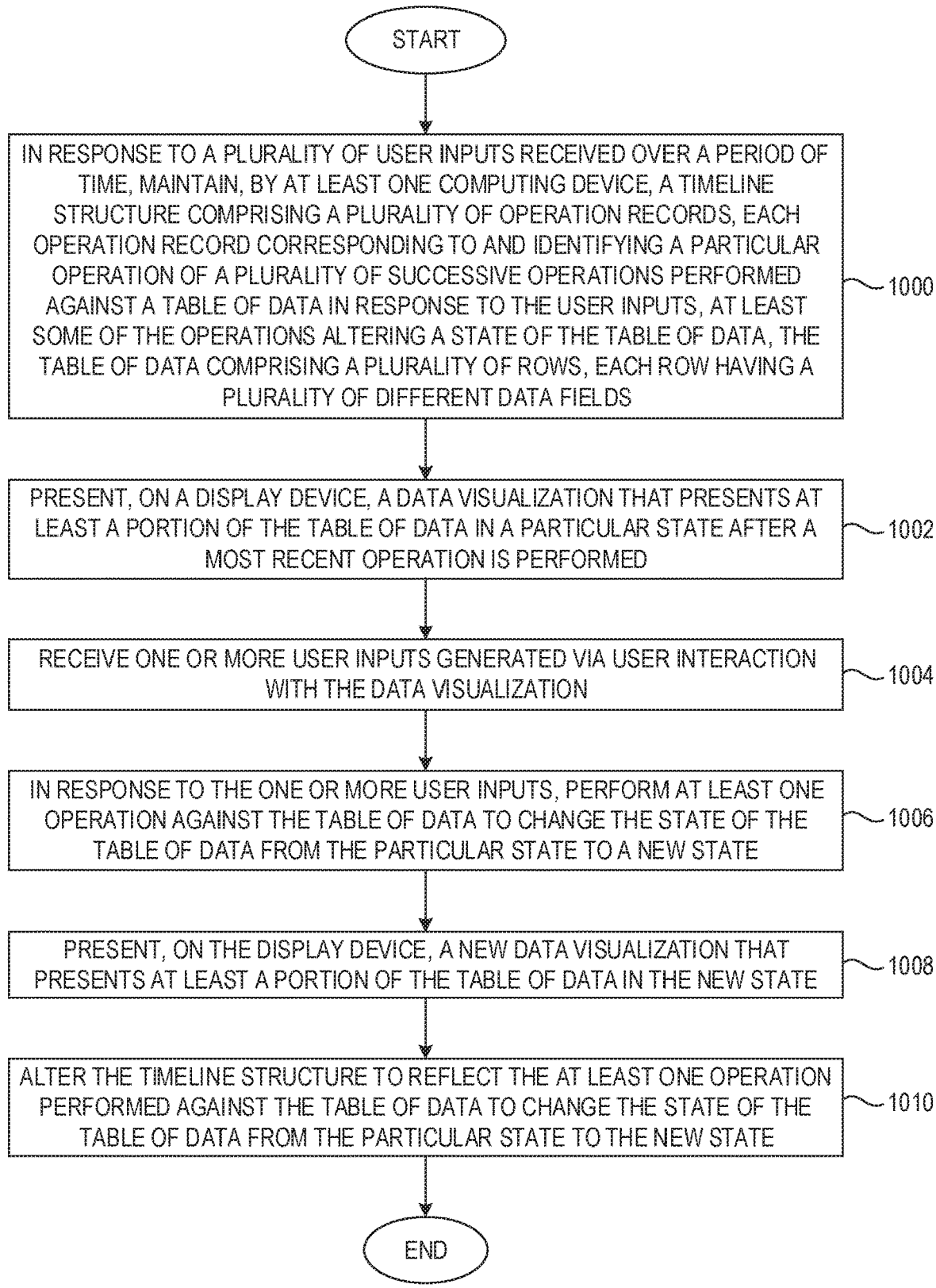
FIG. 4 is a flowchart of a method for automatic generation and insertion of operations into a timeline of operations via interactions with a data grid according to one embodiment.

FIG. 4 is a flowchart of a method for automatic generation and insertion of operations into a timeline of operations via interactions with a data grid according to one embodiment. In response to a plurality of user inputs received over a period of time, the analyzer 22 maintains the timeline structure 32 that includes a plurality of operation records 34. Each operation record 34 corresponds to and identifies a particular operation of a plurality of successive operations performed against the table of data 26 in response to the user inputs. At least some of the operations alter the state 36 of the table of data 26, the table of data 26 comprising the plurality of rows 28, and each row 28 having a plurality of different data fields 30 (FIG. 4, block 1000).

The analyzer 22 presents, on the display device 18, the data visualization 50 (FIG. 3A) that presents at least a portion of the table of data 26 in a particular state 36 after a most recent operation is performed (FIG. 4, block 1002). The analyzer 22 receives, via user interaction with the data visualization 50, one or more user inputs (FIG. 4, block 1004). In response to the one or more user inputs, the analyzer 22 performs at least one operation against the table of data 26 to change the state 36 of the table of data 26 from the particular state 36 to a new state 36 (FIG. 4, block 1006). The analyzer 22 presents, on the display device 18, the new data visualization 56 (FIG. 3C) that presents at least a portion of the table of data 26 in the new state 36 (FIG. 4, block 1008). The analyzer 22 alters the timeline structure 32 to reflect the at least one operation performed against the table of data 26 to change the state 36 of the table of data 26 from the particular state 36 to the new state 36 (FIG. 4, block 1010).

Figure 5A:
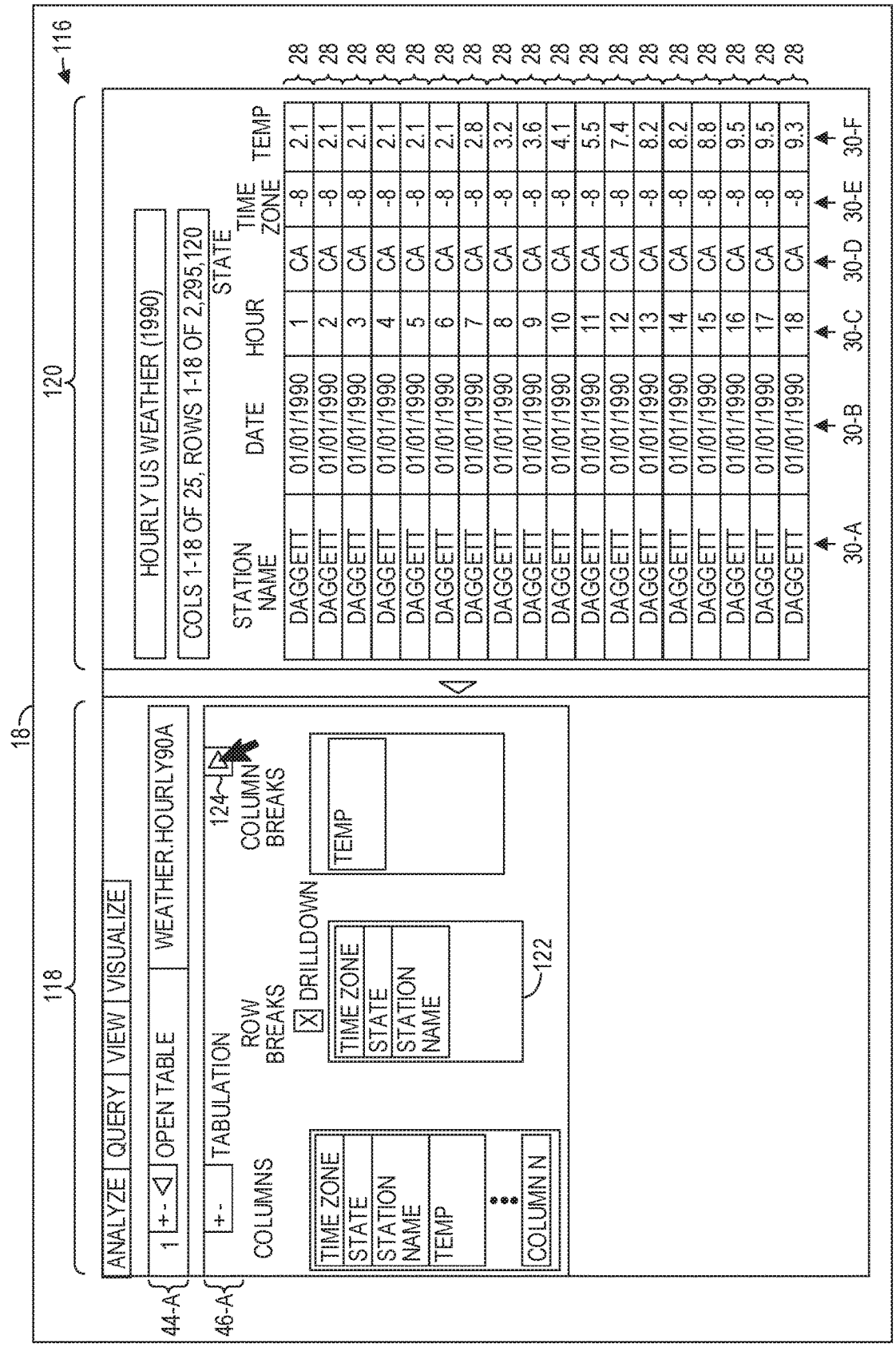
FIGS. 5A-5I illustrate additional mechanisms for automatic generation and insertion of operations into a timeline of operations via interactions with a data visualization according to another embodiment.

FIGS. 5A-5I illustrate additional mechanisms for automatic generation and insertion of operations into a timeline of operations via interactions with a data visualization according to another embodiment. In this embodiment, the user 24 has opened a table of data 26 that contains hourly weather station data of weather stations throughout the United States for 1990. The table of data 26 contains different data than the tables of data 26 discussed previously. After opening the table of data 26, the user 24 has interacted with the analyzer 22 via one or more visualizations such that a timeline structure 32 has been generated that contains an operation record that corresponds to an open table operation. Referring first to FIG. 5A, at a time T1, the user 24 is interacting with the analyzer 22 via a visualization 116 that includes a timeline structure visualization 118 and a data visualization 120 that depicts a portion of the table of data 26. The timeline structure visualization 118 includes an operation record visualization 44-A that corresponds to the open table operation previously requested by the user 24 and performed by the analyzer 22.

The user 24 is interacting with a new operation visualization 46-A to generate a tabulation operation, which has not yet been performed. The data visualization 120 depicts a portion of the table of data 26, in particular the first eighteen rows of 2,295,120 rows, each row containing a number of data fields, including data fields 30-A-30-F. Each row 28 identifies, among other information, the hourly temperature (in degrees Celsius) recorded at a particular weather station somewhere in a US territory. In particular, each row 28 includes a data field 30-A that identifies a station name, a data field 30-B that identifies a date, a data field 30-C that identifies an hour (of a 24-hour day), a data field 30-D that identifies a state in which the weather station is located, a data field 30-E that identifies a time zone in which the weather station is located, and a data field 30-F that identifies a temperature recorded by the weather station during that hour on that date. Each row 28 includes additional fields, not relevant to the discussion herein, that may be viewed by the user 24 by scrolling or otherwise manipulating a UI control, such as an arrow key on a keyboard.

A tabulation operation groups rows of the table of data 26 together based on the data values in one or more data fields and performs calculations on data values in each of those groups. The term "data fields" is synonymous with the word "columns" in the context of FIGS. 5A-5I. In this example, the user 24 has requested that the tabulation operation perform calculations on data values from groupings based on the data field 30-E (time zone), the data field 30-D (state), and the data field 30-A (station name), as indicated via a user input control 122. The user 24 has also requested that the tabulation operation implement a "drilldown" feature that will allow the user 24 to view the results of the tabulation operation and "drilldown" into certain details, as described below. The user 24 selects a go control 124.

Note that the data fields 30-E, 30-D and 30-A have a hierarchical relationship in that the top level data field, 30-E (time zones) has a fewer number of possible unique values than the data field 30-D (state). Similarly, the data field 30-D has a fewer number of possible unique values than the data field 30-A. The tabulation operation identifies an aggregate operation that will be based on one or more data fields 30 in each row. In this example, the aggregate operation is the average temperature. Thus, when the tabulation operation is performed, the analyzer 22 will initially group all rows 28 of the state 36 of the table of data 26 into groups based on unique values of the data field 30-E (time zone). The tabulation operation will then determine the average temperature for each individual group of the rows 28 and depict the average temperature for each separate group.

Figure 5B:
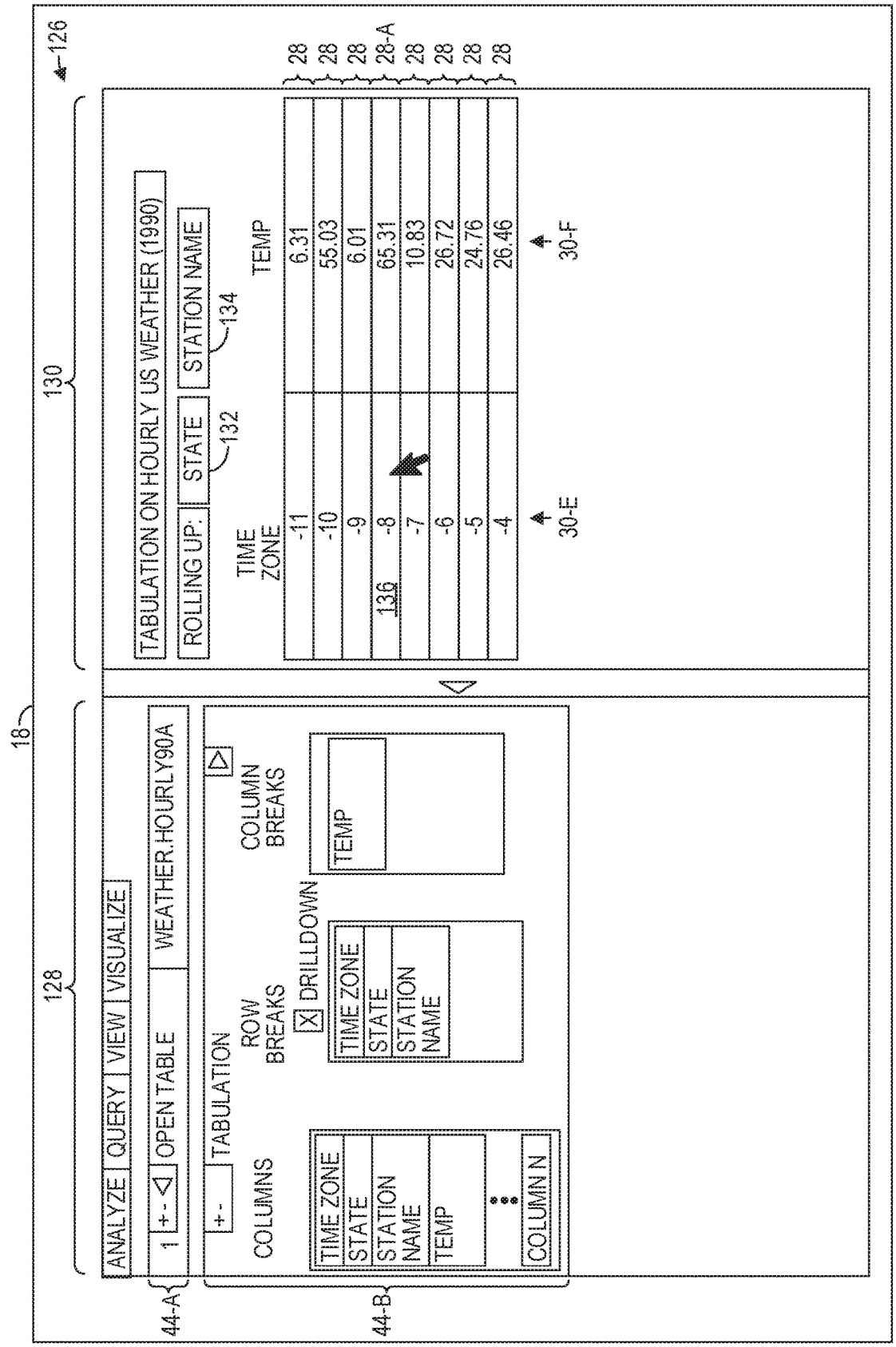

The analyzer 22 receives the user inputs of the user 24, and performs the requested tabulation operation, and generates and records an operation record 34 in a timeline structure 32 that corresponds to the tabulation operation and that includes all of the parameters of the tabulation operation requested by the user 24 via the new operation visualization 46-A. Referring now to FIG. 5B, after performing the tabulation operation, the analyzer 22 generates a visualization 126 which includes a timeline structure visualization 128 and a data visualization 130 that depicts a portion of a table of data 26 in a state 36 after the tabulation operation has been performed.

Note that throughout FIGS. 5B through 5I a timeline visualization will be shown in conjunction with a data visualization to clearly illustrate changes the analyzer 22 is making to the operation records 34 that correspond to operation record visualizations 44. However, it is noted that the user 24 can, at any point in time past that point in time illustrated in FIG. 5A, request that the timeline visualizations be hidden, thus potentially allowing a larger amount of data to be shown, in a manner identical to that discussed above with regard to FIGS. 3A-3N.

The data visualization 130 includes a plurality of rows 28 each of which shows an average temperature in the data field 30-F for all stations in a particular time zone that is identified in the data field 30-E. Each data value identified in a data field 30-E can be selected by the user 24 to drill down into the details of any particular time zone. The data visualization 130 also contains a state rollup icon 132 and a station name rollup icon 134 to indicate that the data values in the rows 28 are aggregate values and that more detail is available, upon request, regarding states and station names. In this example, the user 24 selects, such as by left-clicking a mouse, a data value 136 contained in the data field 30-E of row 28-A. The selection of the data value 136 is a request to "drill-down" into the details of the time zone −8 based on the data field 30-D (state), as identified in the input control 122 (FIG. 5A).

Figure 5C:
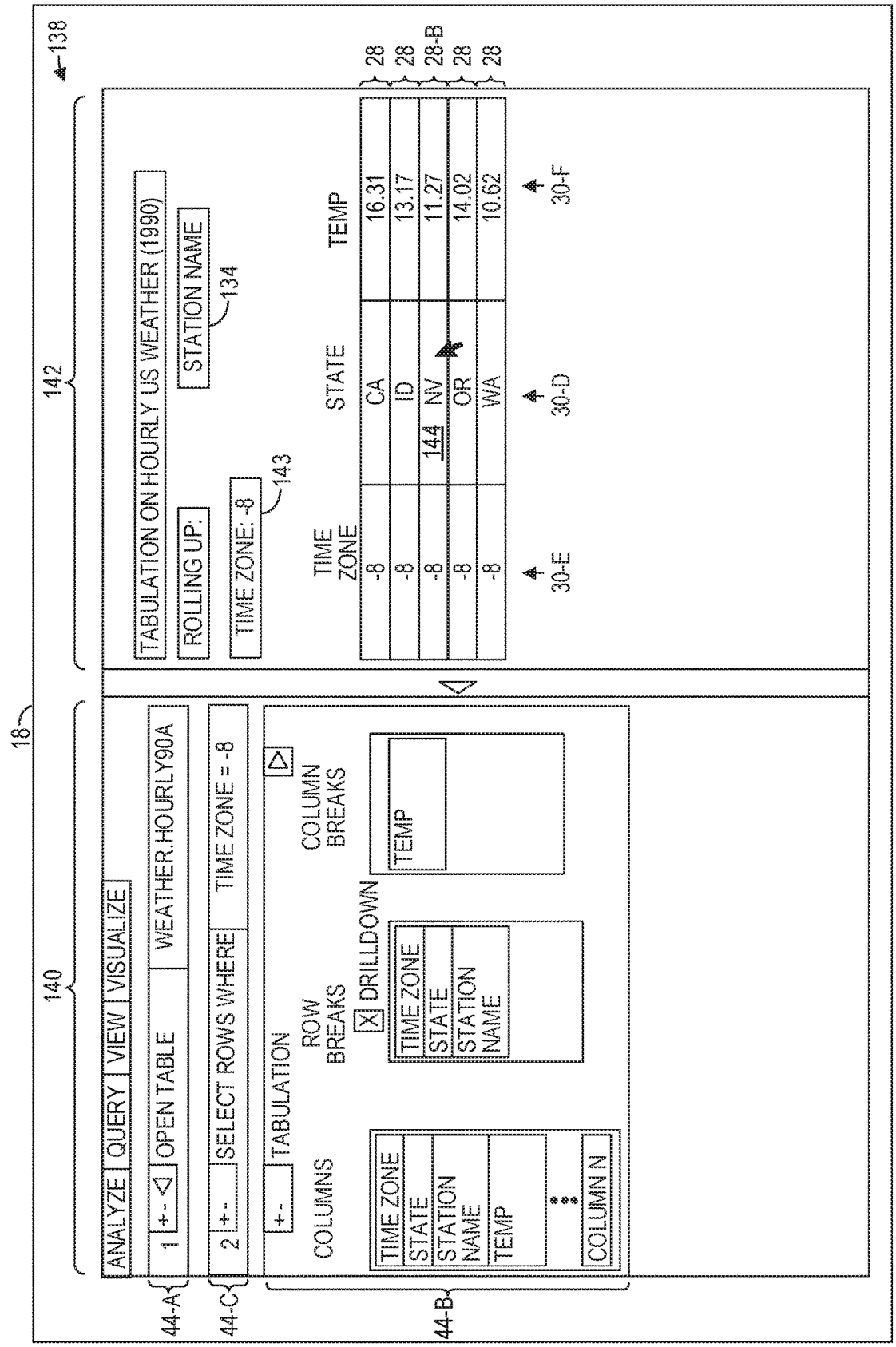

In response to the user input selecting the data value 136, the analyzer 22 generates a select operation record that identifies a select operation on the data field 30-E using the data value "−8", and inserts the select operation record in the timeline structure 32 above (in time sequence) the tabulation operation so that the tabulation command will be re-performed after the select operation is performed. The analyzer 22 then performs the select operation using the data value "−8", and then automatically re-performs each subsequent operation identified in the timeline structure 32, which at this point in time is only the tabulation operation, to generate a new state 36. The tabulation operation will now, for each different unique value of the data field 30-D (state), which, due to the automatic generation of the selection operation, will be limited to those states in time zone −8, create groupings of rows 28 based on the unique values of the data field 30-D (state). For each such group of rows 28, the analyzer 22 will determine the average temperature. Referring now to FIG. 5C, the analyzer 22 generates a visualization 138 which includes a timeline structure visualization 140 and a data visualization 142 that depicts a portion of a table of data 26 in the new state 36 after the select operation and the tabulation operation have been performed.

The data visualization 142 includes a plurality of rows 28 each of which shows an average temperature in the data field 30-F for all weather stations in each particular state that is located in the time zone −8. The states are identified in the data fields 30-D. Each data value identified in a data field 30-D can be selected by the user 24 to drill down into the details of any particular state. Note that the data visualization 142 no longer contains the state rollup icon 132 (FIG. 3B) because the states are no longer rolled up at this level, but the data visualization 142 still shows the station name rollup icon 134 to indicate that the data values in the rows 28 are aggregate values and that more detail is available, upon request, regarding station names. The data visualization 142 also includes a quick filter control 143 that corresponds to the newly performed select operation.

Note that the timeline structure visualization 140 now includes an operation record visualization 44-C that corresponds to the generated select operation, and that the operation record visualization 44-C appears above the operation record visualization 44-B to visually convey that the tabulation operation that corresponds to the operation record visualization 44-B is performed subsequent to the select operation that corresponds to the operation record visualization 44-C.

In this example, the user 24 selects, such as by left-clicking a mouse, a data value 144 contained in the data field 30-D of row 28-B. In response to the user input selecting the data value 144, the analyzer 22 generates a new select operation record that identifies a select operation on the data field 30-D using the data value "NV", and inserts the select operation record in the timeline structure 32 above (in time sequence) the tabulation operation so that the tabulation command will be re-performed after this select operation is performed. The analyzer 22 then performs the select operation on the state 36 of the table of data 26 as the state 36 exists immediately after the select operation that corresponds to the operation record visualization 44-C and before the tabulation operation, using the data value "NV", and then automatically re-performs each subsequent operation identified in the timeline structure 32, which at this point in time is only the tabulation operation, to generate a new state 36. The tabulation operation will now, for each different unique value of the data field 30-A (station name), which, due to the automatic generation of the selection operation, will be limited to those station names in Nevada, create groupings of rows 28 based on the unique values of the data field 30-A (station name). For each such group of rows 28, the analyzer 22 will determine the average temperature.

Figure 5D:
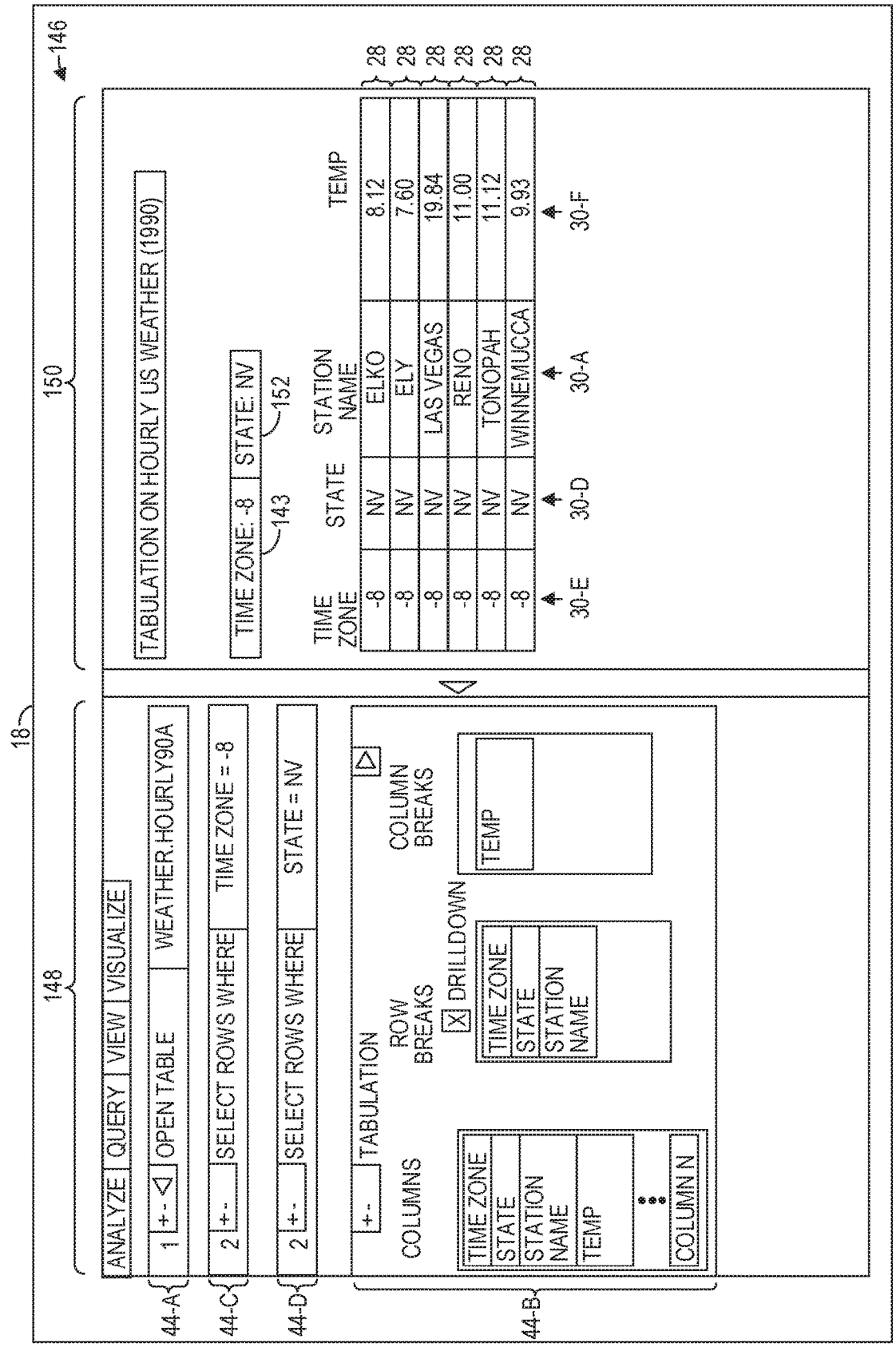

Referring to FIG. 5D, the analyzer 22 generates a visualization 146 which includes a timeline structure visualization 148 and a data visualization 150 that depicts a portion of a table of data 26 in the new state 36 after the select operation and the tabulation operation have been performed. The data visualization 150 includes a plurality of rows 28 each of which shows an average temperature in the data field 30-F for each weather station in the state of Nevada. Note that the data visualization 130 no longer contains the station name rollup icon 134 (FIG. 3B) because the station names are no longer rolled up at this level. The data visualization 142 also includes a quick filter control 152 that corresponds to the newly performed select operation.

Note that the timeline visualization now includes an operation record visualization 44-D that corresponds to the generated select operation, and that the operation record visualization 44-D appears above the operation record visualization 44-B to visually convey that the tabulation operation that corresponds to the operation record visualization 44-B is performed subsequent to the select operation that corresponds to the operation record visualization 44-D.

Figure 5E:
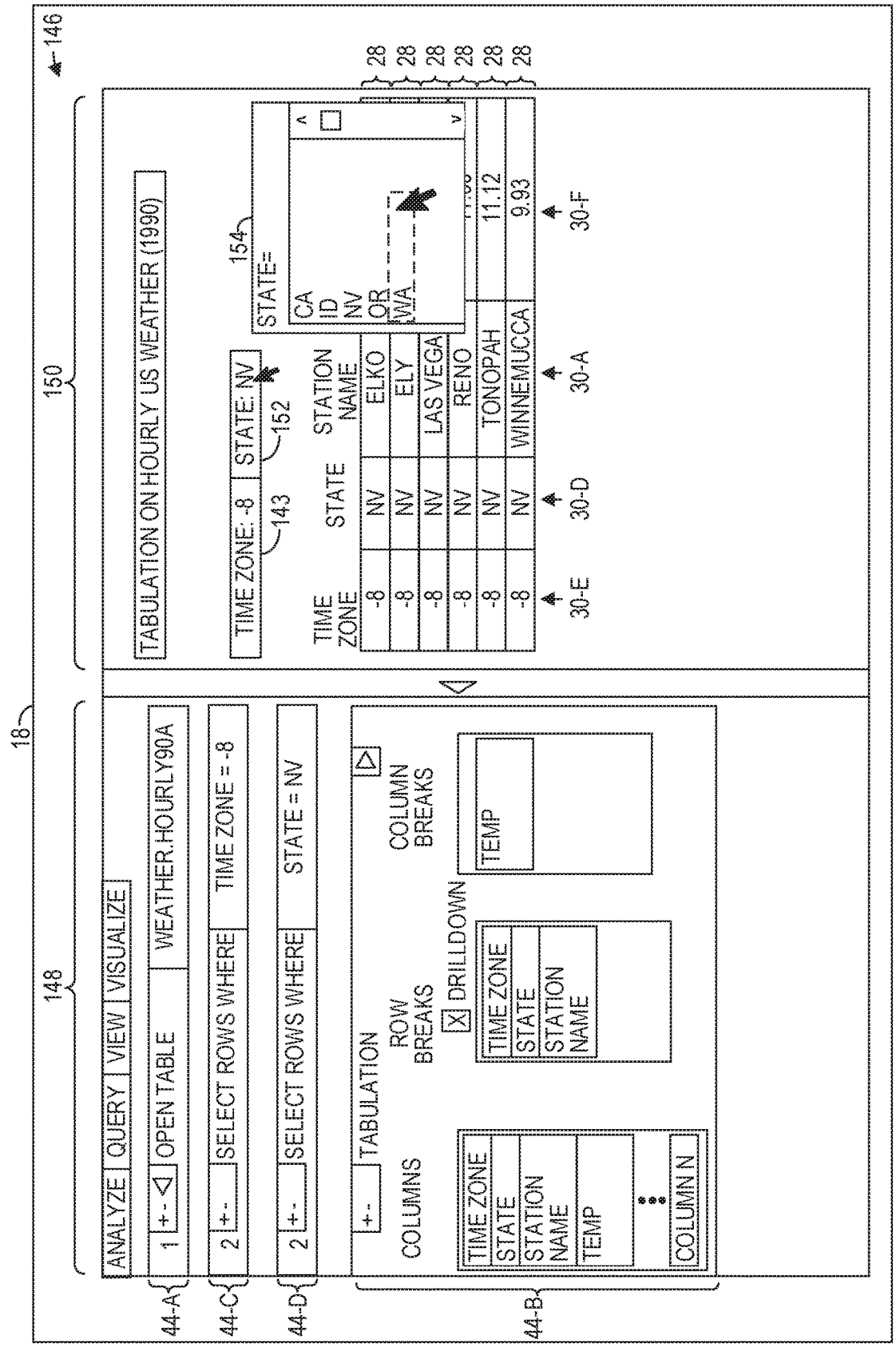

Referring now to FIG. 5E, the user 24 now selects, such as by left-clicking a mouse, a quick filter control 152 that corresponds to a select operation identified via the operation record visualization 44-D. In response to the user input selecting the quick filter control 152, the analyzer 22 generates an operation visualization 154 that lists a plurality of states that are in the time zone −8. In this example, the user 24 selects the state of Washington (i.e., selects "WA").

Figure 5F:
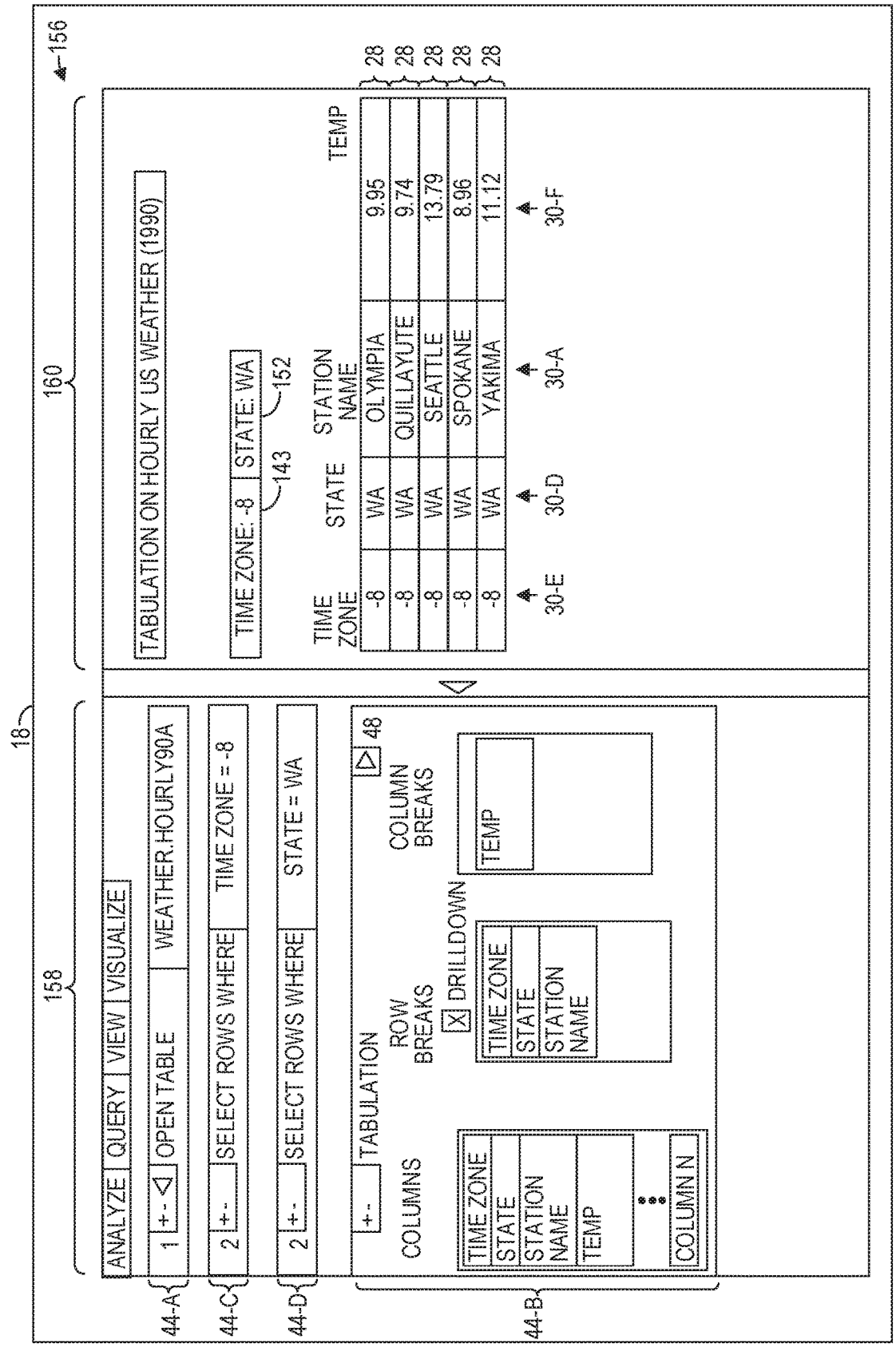

In response, the analyzer 22 modifies the operation record that corresponds to the operation record visualization 44-D to alter the selection criteria from "NV" to "WA". The analyzer 22 performs the new selection operation on the table of data 26 starting with the state 36 of the table of data 26 as the state 36 exists immediately after the select operation that corresponds to operation record visualization 44-C and before the tabulation operation, using the data value "WA", and then automatically re-performs each subsequent operation identified in the timeline structure 32, which at this point in time is the tabulation operation, to generate a new state 36. Referring now to FIG. 5F, the analyzer 22 generates a visualization 156 which includes a timeline structure visualization 158 and a data visualization 160 that depicts a portion of a table of data 26 in the new state 36 after the select operation and the tabulation operation have been performed.

The data visualization 160 includes a plurality of rows 28 each of which shows an average temperature in the data field 30-F for each weather station in the state of Washington. Note that the quick filter control 152 now identifies the selection criteria as WA rather than NV.

Figure 5G:
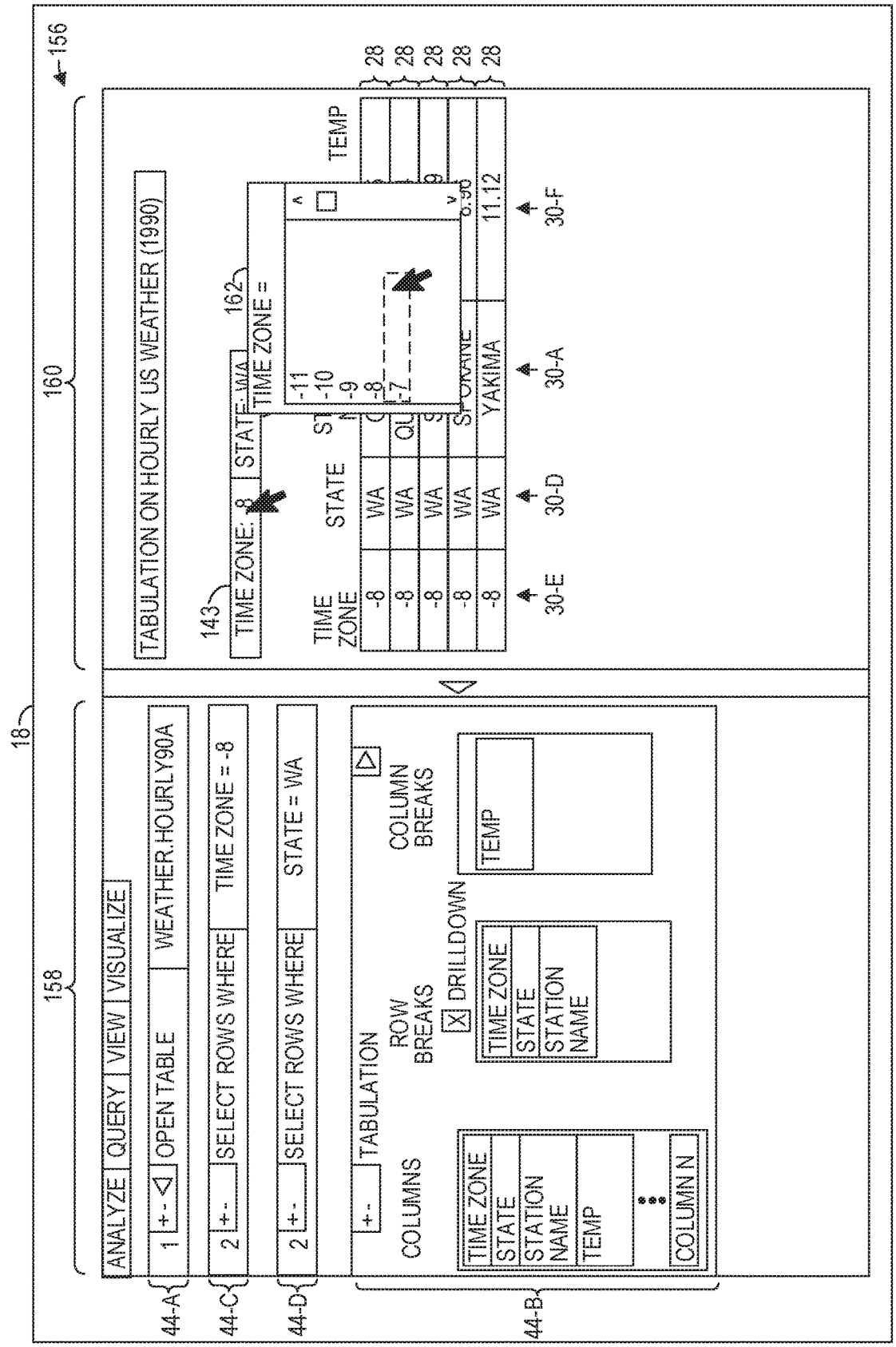

Referring now to FIG. 5G, the user 24 now selects, such as by left-clicking a mouse, the quick filter control 143 that corresponds to the select operation identified via the operation record visualization 44-C. In response to the user input selecting the quick filter control 143, the analyzer 22 generates an operation visualization 162 that lists a plurality of time zones. In this example, the user 24 selects the time zone −7.

Figure 5H:
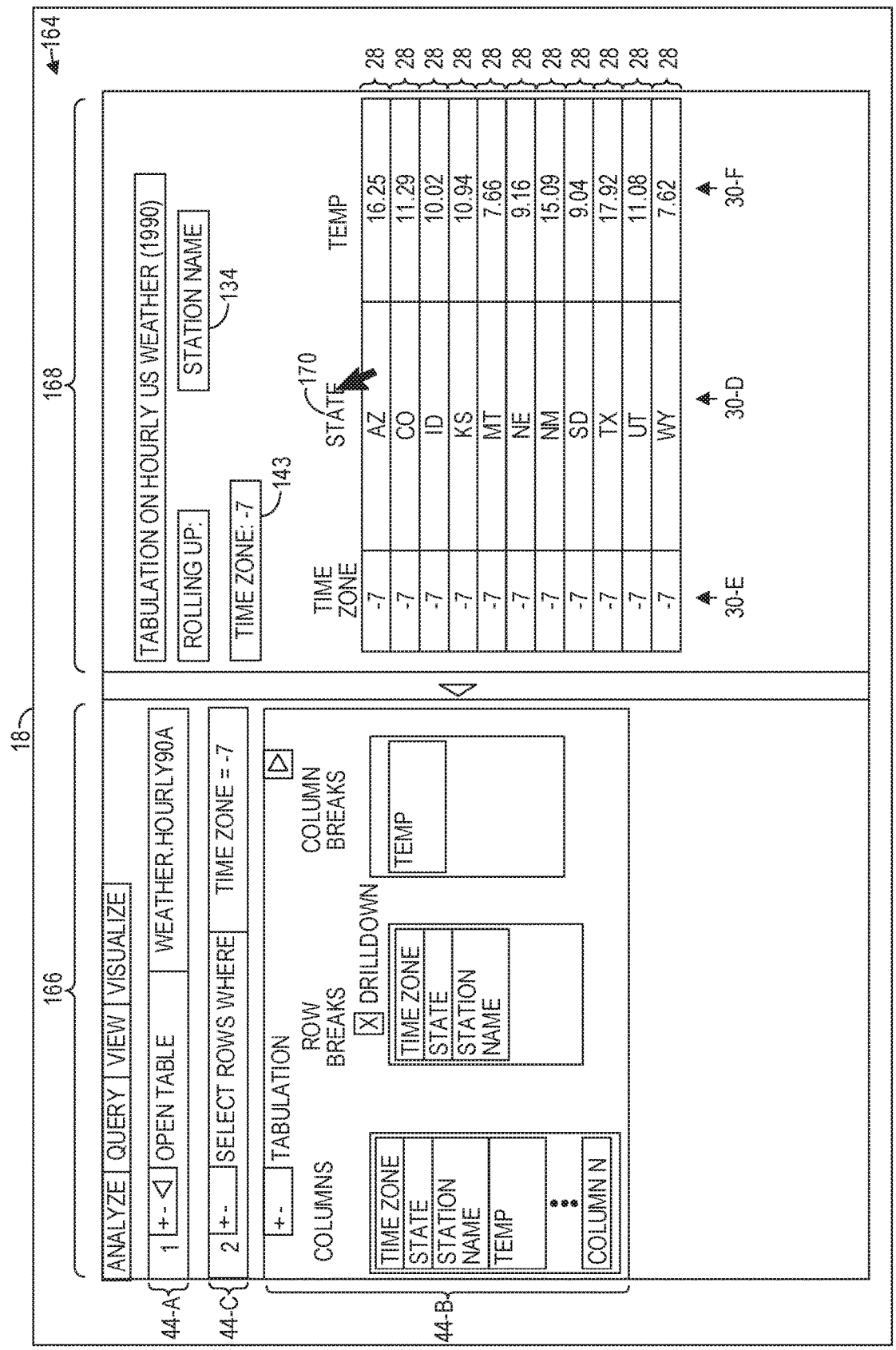

In response, the analyzer 22 modifies the operation record that corresponds to the operation record visualization 44-C to alter the selection criteria from "−8" to "−7". The analyzer 22 also removes from the timeline structure 32 the operation record that corresponds to the operation record visualization 44-D, such that the selection operation with a selection criteria of state=NV will not be performed, since Nevada is not in time zone −7. The analyzer 22 performs the selection operation using the selection criteria of −7 on the table of data 26 starting with the state 36 of the table of data 26 as the state 36 existed immediately after the table of data 26 was opened and then automatically re-performs each subsequent operation identified in the timeline structure 32, which at this point in time is the tabulation operation, to generate a new state 36. Referring now to FIG. 5H, the analyzer 22 generates a visualization 164 which includes a timeline structure visualization 166 and a data visualization 168 that depicts a portion of the table of data 26 in the new state 36 after the select operation and the tabulation operation have been performed.

Similar to FIG. 5C, but now for the time zone −7 rather than the time zone −8, the data visualization 168 includes a plurality of rows 28 each of which shows an average temperature in the data field 30-F for all weather stations in each particular state that is located in the time zone −7. The states are identified in the data fields 30-D. Each data value identified in a data field 30-D can be selected by the user 24 to drill down into the details of any particular state. Note that the data visualization 168 contains the station name rollup icon 134 to indicate that the data values in the rows 28 are aggregate values and that more detail is available, upon request, regarding station names.

Note that the timeline structure visualization 166 no longer contains the operation record visualization 44-D because the operation record corresponding to the operation record visualization 44-D has been removed from the timeline structure 32. The operation record visualization 44-C now identifies the selection criteria as −7.

Figure 5I:
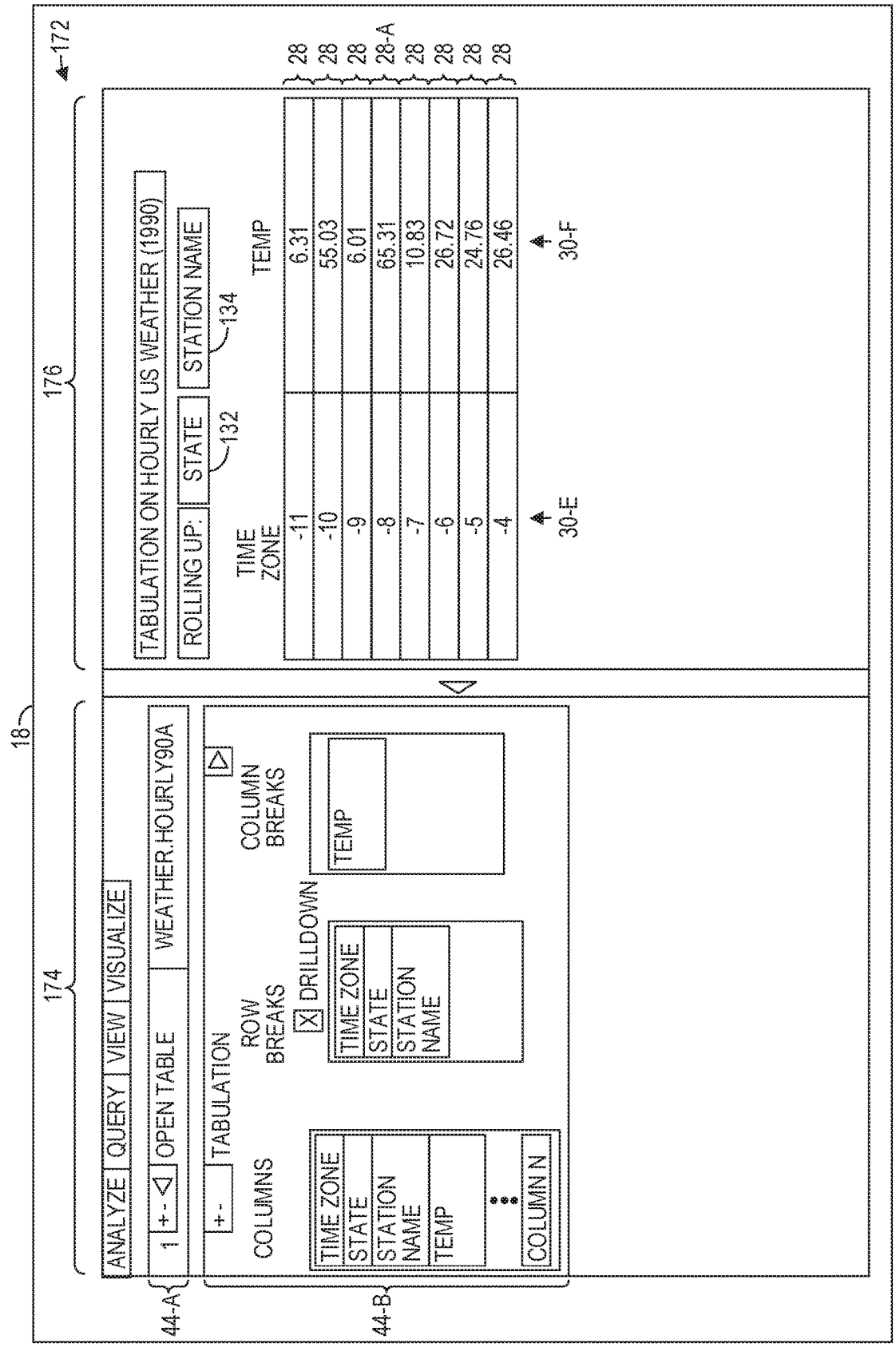

The user 24 selects, such as by left-clicking a mouse, a state column identifier 170, which indicates an intent to "roll-up" the data values in the data field 30-D. In response to the user input selecting the state column identifier 170, the analyzer 22 removes the operation record that corresponds to the operation record visualization 44-C, and performs the tabulation operation on the table of data 26 starting with the state of the table of data 26 as the state existed immediately after the open operation. Referring now to FIG. 5I, the analyzer 22 generates a visualization 172 which includes a timeline structure visualization 174 and a data visualization 176 that depicts a portion of a table of data 26 in the new state 36 after the selection operation has been removed from the timeline structure 32. Note that the visualization 172 looks identical to the visualization 126 illustrated in FIG. 5B.

Figure 6:
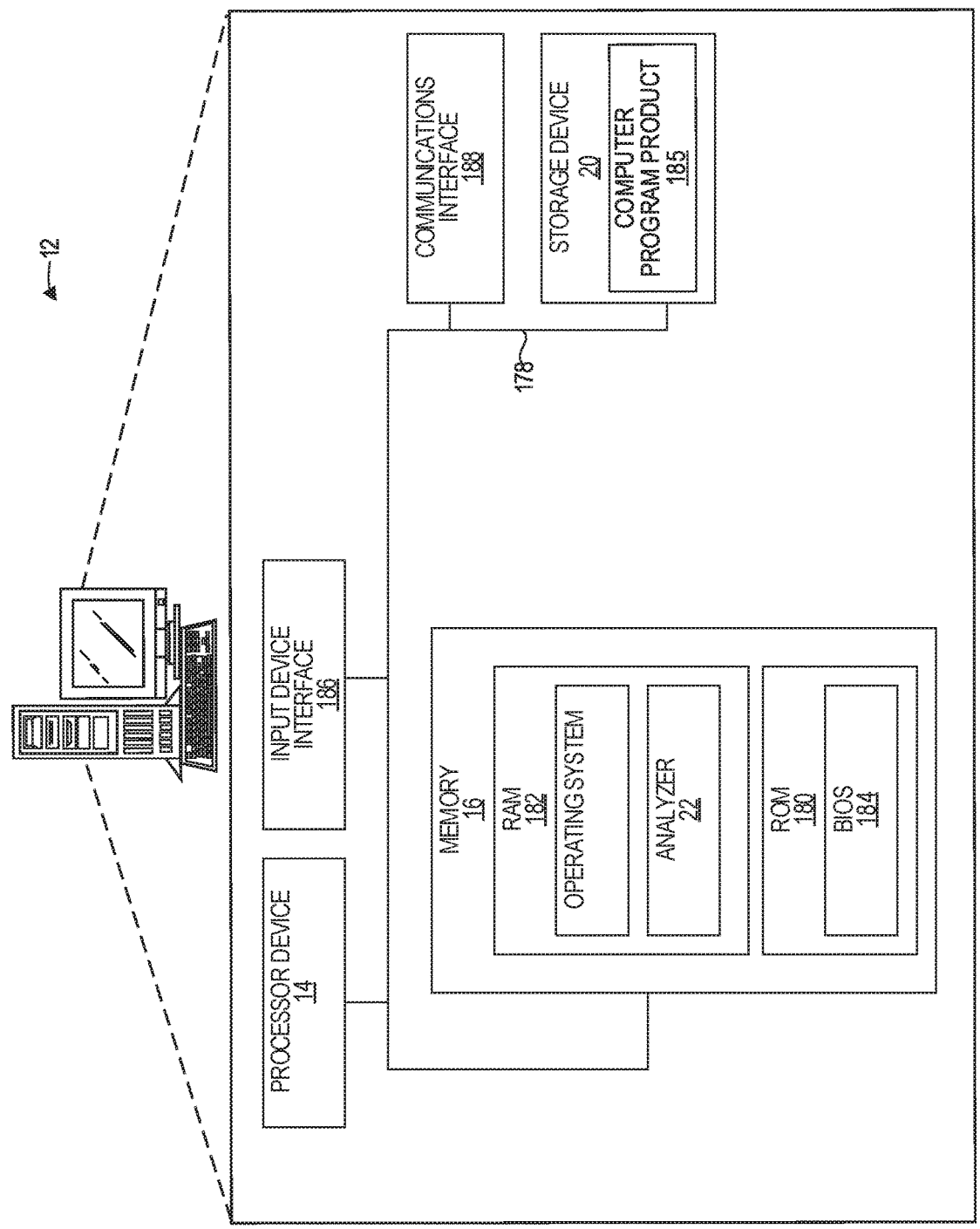
FIG. 6 is a block diagram of a computing device suitable for implementing embodiments according to one example.

FIG. 6 is a block diagram of the computing device 12 suitable for implementing examples according to one example. As discussed above, in some implementations functionality disclosed herein may be implemented in a client-server architecture, such that the functionality described herein may be implemented by a plurality of computing devices 12. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device 14, the system memory 16, and a system bus 178. The system bus 178 provides an interface for system components including, but not limited to, the system memory 16 and the processor device 14. The processor device 14 can be any commercially available or proprietary processor.

The system bus 178 may be any of several types of bus structures that may further interconnect to a memory bus (with or without a memory controller), a peripheral bus, and/or a local bus using any of a variety of commercially available bus architectures. The system memory 16 may include non-volatile memory 180 (e.g., read-only memory (ROM), erasable programmable read-only memory (EPROM), electrically erasable programmable read-only memory (EEPROM), etc.), and volatile memory 182 (e.g., random-access memory (RAM)). A basic input/output system (BIOS) 184 may be stored in the non-volatile memory 180 and can include the basic routines that help to transfer information between elements within the computing device 12. The volatile memory 182 may also include a high-speed RAM, such as static RAM, for caching data.

The computing device 12 may further include or be coupled to a non-transitory computer-readable storage medium such as the storage device 20, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 20 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 20 and in the volatile memory 182, including an operating system and one or more program modules, such as the analyzer 22, which may implement the functionality described herein in whole or in part.

A number of modules can be stored in the storage device 20 and in the volatile memory 182, including, by way of non-limiting example, the analyzer 22. All or a portion of the examples may be implemented as a computer program product 185 stored on a transitory or non-transitory computer-usable or computer-readable storage medium, such as the storage device 20, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the analyzer 22 in the volatile memory 182, may serve as a controller, or control system, for the computing device 12 that is to implement the functionality described herein.

An operator, such as the user 24, may also be able to enter one or more configuration commands through a keyboard (not illustrated), a pointing device such as a mouse (not illustrated), or a touch-sensitive surface such as the display device 18. Such input devices may be connected to the processor device 14 through an input device interface 186 that is coupled to the system bus 178 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 188 suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
in response to a plurality of user inputs received over a period of time, maintaining, by at least one computing device, a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields;
presenting, on a display device, a data visualization that presents at least a portion of the table of data in a particular state after a most recent operation is performed;
receiving one or more user inputs generated via user interaction with the data visualization, the one or more user inputs identifying a new selection criteria that differs from a previous selection criteria of a selection operation identified in an operation record of the plurality of operation records wherein the selection operation is one of a plurality of operations identified in the timeline structure;
in response to the one or more user inputs, performing the selection operation against the table of data to change the state of the table of data from a state that the table of data was in immediately prior to performing the selection operation with the previous selection criteria to generate a table of data having a different state from the particular state, the different state comprising only those rows in the table of data that meet the new selection criteria, wherein the timeline structure identifies at least one additional operation that was previously performed subsequent to the selection operation with the previous selection criteria;
subsequent to performing the selection operation against the table of data to generate the table of data having the different state, automatically performing the at least one additional operation against the table of data having the different state to generate a table of data in a new state;
presenting, on the display device, a new data visualization that presents at least a portion of the table of data in the new state without presenting on the display device information that identifies the successive operations; and
altering the timeline structure to reflect the at least one operation performed against the table of data to change the state of the table of data from the particular state to the new state.

2. The method of claim 1 further comprising:
subsequent to presenting, on the display device, the new data visualization, receiving a user input that requests a timeline structure visualization be depicted; and
presenting, on the display device, a timeline structure visualization that depicts operation record visualizations that identify at least a portion of the plurality of operations performed against the table of data including the at least one operation while concurrently presenting, on the display device, at least a portion of the new data visualization.

3. The method of claim 1 further comprising:
prior to receiving the one or more user inputs, receiving a user input that corresponds to a location of a data field in a row depicted in the data visualization;
presenting, on the display device, an operation visualization that identifies a set of operations that can be performed against the table of data; and
wherein the one or more user inputs identify, via the operation visualization, the at least one operation from the set of operations.

4. The method of claim 1 further comprising:
subsequent to presenting the new data visualization that presents the at least the portion of the table of data in the new state, receiving a user input that corresponds to a location of a data field in a row depicted in the new data visualization;
in response to receiving the user input that corresponds to the location of the data field, presenting, on the display device, a user interface (UI) window that allows the user to identify find criteria for locating rows in the table of data based on the find criteria;
analyzing the table of data to locate each row of the plurality of rows based on the find criteria;
presenting, on the display device, a grid that presents at least one row located based on the find criteria;
receiving user input that requests that a new selection operation be generated in the timeline structure based on the find criteria;
altering the timeline structure to reflect the new selection operation; and
performing the new selection operation against the table of data to change the state of the table of data to only those rows that meet the find criteria.

5. The method of claim 1 further comprising:
subsequent to presenting the new data visualization that presents the at least the portion of the table of data in the new state, receiving a user input that corresponds to a location of a data field in a row depicted in the new data visualization;
in response to receiving the user input that corresponds to the location of the data field, presenting, on the display device, a UI window that allows the user to alter a data value presented in the data field;
receiving user input that provides a new data value;
presenting, on the display device, a new data visualization that presents at least a portion of the table of data with the new data value; and
adding to the timeline structure a new operation record that identifies the new data value.

6. The method of claim 1 wherein the timeline structure includes a tabulation operation record that corresponds to a tabulation operation performed against the table of data, the tabulation operation record identifying a hierarchy of at least a first data field and a second data field, the first data field having a fewer number of possible unique values than the second data field, wherein the tabulation operation identifies rows of the table of data based on unique data values in the first data field, and derives a first aggregate value for each group of rows of data that have the same unique data value in the first data field, and wherein the data visualization depicts a plurality of first rows of data, each first row of data corresponding to one of the groups of rows of data and depicting the unique data value that corresponds to that group of rows of data and depicting the aggregate value derived for that group of rows of data.

7. The method of claim 6 further comprising:
receiving, via user interaction with the data visualization, user input that identifies a unique data value in the first data field depicted in the data visualization;
in response to receiving the user input that identifies the unique data value, generating a selection operation record with a selection criteria equal to the unique data value identified by the user input;
inserting the selection operation record prior to the tabulation operation record in the timeline structure;
performing a selection operation with the selection criteria equal to the unique data value identified by the user input to identify only those rows of the table of data that have the unique data value in the first data field; and
automatically performing the tabulation operation, wherein the tabulation operation identifies rows of the table of data based on unique data values in the second data field, and derives a second aggregate value for each group of rows of data that have the same unique data value in the second data field, and wherein the data visualization depicts a plurality of second rows of data, each second row of data corresponding to one of the groups of rows of data and depicting the unique data value that corresponds to that group of rows of data and depicting the aggregate value derived for that group of rows of data.

8. A computing system, comprising:
one or more memories; and
one or more processor devices coupled to the one or more memories configured to:
    in response to a plurality of user inputs received over a period of time, maintain a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields;
    present, on a display device, a data visualization that presents at least a portion of the table of data in a particular state after a most recent operation is performed;
    receive one or more user inputs generated via user interaction with the data visualization, the one or more user inputs identifying a new selection criteria that differs from a previous selection criteria of a selection operation identified in an operation record of the plurality of operation records wherein the selection operation is one of a plurality of operations identified in the timeline structure;
    in response to the one or more user inputs, perform the selection operation against the table of data to change the state of the table of data from a state that the table of data was in immediately prior to performing the selection operation with the previous selection criteria to generate a table of data having a different state from the particular state, the different state comprising only those rows in the table of data that meet the new selection criteria, wherein the timeline structure identifies at least one additional operation that was previously performed subsequent to the selection operation with the previous selection criteria;
    subsequent to performing the selection operation against the table of data to generate the table of data having the different state, automatically perform the at least one additional operation against the table of data having the different state to generate a table of data in a new state;
    present, on the display device, a new data visualization that presents at least a portion of the table of data in the new state without presenting on the display device information that identifies the successive operations; and
    alter the timeline structure to reflect the at least one operation performed against the table of data to change the state of the table of data from the particular state to the new state.

9. The computing system of claim 8 wherein the one or more processor devices are further configured to:
subsequent to presenting, on the display device, the new data visualization, receive a user input that requests a timeline structure visualization be depicted; and
present, on the display device, a timeline structure visualization that depicts operation record visualizations that identify at least a portion of the plurality of operations performed against the table of data including the at least one operation while concurrently presenting, on the display device, at least a portion of the new data visualization.

10. The computing system of claim 8 wherein the one or more processor devices are further configured to:
subsequent to presenting the new data visualization that presents the at least the portion of the table of data in the new state, receive a user input that corresponds to a location of a data field in a row depicted in the new data visualization;
in response to receiving the user input that corresponds to the location of the data field, present, on the display device, a user interface (UI) window that allows the user to identify find criteria for locating rows in the table of data based on the find criteria;
analyze the table of data to locate each row of the plurality of rows based on the find criteria;
present, on the display device, a grid that presents at least one row located based on the find criteria;
receive user input that requests that a new selection operation be generated in the timeline structure based on the find criteria;
alter the timeline structure to reflect the new selection operation; and
perform the new selection operation against the table of data to change the state of the table of data to only those rows that meet the find criteria.

11. A method comprising:
in response to a plurality of user inputs received over a period of time, maintaining, by at least one computing device, a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields;
presenting, on a display device, a data visualization that presents at least a portion of the table of data in a particular state after a most recent operation is performed;
receiving one or more user inputs generated via user interaction with the data visualization;
in response to the one or more user inputs, performing at least one operation against the table of data to change the state of the table of data from the particular state to a new state;
presenting, on the display device, a new data visualization that presents at least a portion of the table of data in the new state;
altering the timeline structure to reflect the at least one operation performed against the table of data to change the state of the table of data from the particular state to the new state;
subsequent to presenting the new data visualization that presents the at least the portion of the table of data in the new state, receiving a user input that corresponds to a location of a data field in a row depicted in the new data visualization;
in response to receiving the user input that corresponds to the location of the data field, presenting, on the display device, a UI window that allows the user to alter a data value presented in the data field;
receiving user input that provides a new data value;
presenting, on the display device, a new data visualization that presents at least a portion of the table of data with the new data value; and
adding to the timeline structure a new operation record that identifies the new data value.

12. A computing system, comprising:
one or more memories; and
one or more processor devices coupled to the one or more memories configured to:
in response to a plurality of user inputs received over a period of time, maintain a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields;
present, on a display device, a data visualization that presents at least a portion of the table of data in a particular state after a most recent operation is performed;
receive one or more user inputs generated via user interaction with the data visualization;
in response to the one or more user inputs, perform at least one operation against the table of data to change the state of the table of data from the particular state to a new state;
present, on the display device, a new data visualization that presents at least a portion of the table of data in the new state;
alter the timeline structure to reflect the at least one operation performed against the table of data to change the state of the table of data from the particular state to the new state;
subsequent to presenting the new data visualization that presents the at least the portion of the table of data in the new state, receive a user input that corresponds to a location of a data field in a row depicted in the new data visualization;
in response to receiving the user input that corresponds to the location of the data field, present, on the display device, a UI window that allows the user to alter a data value presented in the data field;
receive user input that provides a new data value;
present, on the display device, a new data visualization that presents at least a portion of the table of data with the new data value; and
add to the timeline structure a new operation record that identifies the new data value.

13. A method comprising:
in response to a plurality of user inputs received over a period of time, maintaining, by at least one computing device, a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields;
presenting, on a display device, a data visualization that presents at least a portion of the table of data in a particular state after a most recent operation is performed;
receiving one or more user inputs generated via user interaction with the data visualization;
in response to the one or more user inputs, performing at least one operation against the table of data to change the state of the table of data from the particular state to a new state;
presenting, on the display device, a new data visualization that presents at least a portion of the table of data in the new state, wherein the timeline structure includes a tabulation operation record that corresponds to a tabulation operation performed against the table of data, the tabulation operation record identifying a hierarchy of at least a first data field and a second data field, the first data field having a fewer number of possible unique values than the second data field, wherein the tabulation operation identifies rows of the table of data based on unique data values in the first data field, and derives a first aggregate value for each group of rows of data that have the same unique data value in the first data field, and wherein the new data visualization depicts a plurality of first rows of data, each first row of data corresponding to one of the groups of rows of data and depicting the unique data value that corresponds to that group of rows of data and depicting the aggregate value derived for that group of rows of data; and
altering the timeline structure to reflect the at least one operation performed against the table of data to change the state of the table of data from the particular state to the new state.

14. A computing system, comprising:
one or more memories; and
one or more processor devices coupled to the one or more memories configured to:
in response to a plurality of user inputs received over a period of time, maintain a timeline structure comprising a plurality of operation records, each operation record corresponding to and identifying a particular operation of a plurality of successive operations performed against a table of data in response to the user inputs, at least some of the operations altering a state of the table of data, the table of data comprising a plurality of rows, each row having a plurality of different data fields;

present, on a display device, a data visualization that presents at least a portion of the table of data in a particular state after a most recent operation is performed;

receive one or more user inputs generated via user interaction with the data visualization;

in response to the one or more user inputs, perform at least one operation against the table of data to change the state of the table of data from the particular state to a new state;

present, on the display device, a new data visualization that presents at least a portion of the table of data in the new state, wherein the timeline structure includes a tabulation operation record that corresponds to a tabulation operation performed against the table of data, the tabulation operation record identifying a hierarchy of at least a first data field and a second data field, the first data field having a fewer number of possible unique values than the second data field, wherein the tabulation operation identifies rows of the table of data based on unique data values in the first data field, and derives a first aggregate value for each group of rows of data that have the same unique data value in the first data field, and wherein the new data visualization depicts a plurality of first rows of data, each first row of data corresponding to one of the groups of rows of data and depicting the unique data value that corresponds to that group of rows of data and depicting the aggregate value derived for that group of rows of data; and alter the timeline structure to reflect the at least one operation performed against the table of data to change the state of the table of data from the particular state to the new state.

* * * * *